United States Patent
Tsiyoni

(10) Patent No.: US 8,167,074 B1
(45) Date of Patent: May 1, 2012

(54) THREE-WHEEL, DRIVER'S STAND-UP, PORTABLE, LEVERLESS VEHICLE, WITH FOOT BRAKE LEVER AND CONNECTING METHOD THEREOFF

(76) Inventor: Joseph Tsiyoni, Tempe, AZ (US)

( * ) Notice: Subject to any disclaimer, the term of this patent is extended or adjusted under 35 U.S.C. 154(b) by 189 days.

(21) Appl. No.: 12/661,422

(22) Filed: Mar. 17, 2010

(51) Int. Cl.
*B62D 61/08* (2006.01)
*B62K 15/00* (2006.01)

(52) U.S. Cl. ......... 180/214; 180/208; 180/210; 180/217
(58) Field of Classification Search .......... 180/208, 180/210, 214, 217
See application file for complete search history.

(56) References Cited

U.S. PATENT DOCUMENTS

| | | | |
|---|---|---|---|
| 2,482,203 A | | 9/1949 | Peterson et al. |
| 3,506,080 A | * | 4/1970 | Haddix et al. ............... 180/214 |
| 3,512,599 A | * | 5/1970 | Haddix et al. ............... 180/217 |
| 4,570,739 A | | 2/1986 | Kramer |
| 4,750,578 A | | 6/1988 | Brandenfels |
| 4,909,525 A | * | 3/1990 | Flowers ........................ 280/30 |
| 4,947,955 A | | 8/1990 | Hopely, Jr. |
| 5,249,636 A | | 10/1993 | Kruse et al. |
| 5,413,187 A | | 5/1995 | Kruse et al. |
| 6,176,337 B1 | | 1/2001 | McConnell et al. |
| 6,199,652 B1 | | 3/2001 | Mastroianni et al. |
| 6,302,230 B1 | | 10/2001 | Kamen et al. |
| 6,343,667 B2 | | 2/2002 | Sauve |
| 6,371,235 B1 | | 4/2002 | Wisecarver |
| 6,378,642 B1 | | 4/2002 | Sutton |
| 6,979,229 B1 | * | 12/2005 | Liao et al. ..................... 439/660 |
| 7,044,249 B2 | * | 5/2006 | Fan ............................... 180/208 |
| 7,192,040 B2 | | 3/2007 | Xie |
| 7,699,130 B2 | * | 4/2010 | Palmer ......................... 180/180 |
| 2002/0125709 A1 | * | 9/2002 | Wu ............................... 280/771 |
| 2005/0077097 A1 | * | 4/2005 | Kosco et al. .................. 180/208 |
| 2007/0045014 A1 | | 3/2007 | Greig et al. |
| 2008/0261435 A1 | | 10/2008 | Brinkhous et al. |
| 2009/0255747 A1 | | 10/2009 | Kasaba et al. |
| 2009/0308676 A1 | * | 12/2009 | Wang ............................ 180/208 |
| 2011/0247889 A1 | * | 10/2011 | Kosco et al. .................. 180/208 |

* cited by examiner

*Primary Examiner* — Drew Brown

(57) ABSTRACT

A slow speed, driver's stand-up only, three-wheels, portable, leverless, extremely lightweight, two-part personal mobility vehicle. A front major part, wheel drive assembly, comprising of an upper sub-part, comprising of levers free steering handle mounted on steering column. A lower sub-part comprises of an extended backwards supporting leg, a control box, an electric chain motor assembly, a fork assembly, and front wheel assembly. A two-part hinge assembly below the steering column, enabling folding steering column, and, if necessary, removal. A second major part, a rear assembly chassis, comprising of a riders flat platform surface mounted on a rectangular metal frame, partially mounted on a rear axle, which is connected to both rear wheels. A rear hydraulic foot brake system installed in both rear wheels, whereby a foot brake (pedal) lever formed on top platform surface. An alternative, none-emergency hand brake lever, may be fastened on the steering handle. A removable battery pack is formed on the platform surface. A two-part telescopic box fit assembly, whereby a receiving part is mounted upward on the end of extended leg; a second, sleeve-type part, is formed, respectively, downward on the front platform frame, for interconnecting both major vehicle parts into a complete vehicle, ready to drive at lower speed than 5 MPH. Two sets of simple outlet-plug assembly are formed on respective parts of the battery and platform, and on both ends of the telescopic assembly to supply power to the motor. Said telescopic connecting mechanism enables assembly, disassembly, loading and unloading in less than seven seconds.

16 Claims, 8 Drawing Sheets

THREE-WHEEL, DRIVER'S STAND-UP, PORTABLE, LEVERLESS VEHICLE, WITH FOOT BRAKE LEVER AND CONNECTING METHOD THEREOFF

CROSS-REFERENCE TO RELATED APPLICATION

The current application claims priority to prior filed application Ser. No. 61/201,714, entitled Portable Personal Transporter-Scooter, filed Mar. 23, 2009.

BACKGROUND OF THE INVENTION

1. Field of the Invention

The present invention relates to vehicles and methods of electric standing personal mobility transporter vehicle for transporting individuals, mostly with prolong walk inability, or total inability to walk, but can stand, and more particularly, to a two-part, compact, lightweight, portable, leverless vehicle and methods of connecting two major parts of the vehicle with a two-part telescopic box fit mechanism, and a rear wheels hydraulic brake system activated by a foot (pedal) lever.

2. The Prior Art

According to a published research, more than seventy million American have prolong walk inability, or total inability to walk, due to numerous medical condition associated with osteoarthritis, disability and for some other medical and health issues, whereby as much as 750,000 (estimated) individuals undergo knee and hip replacement every year. In addition, millions others have limited prolong walk or total inability to walk, due to other, numerous, medical conditions. For the purpose of this invention, all such millions individuals are included in the category of 'limited prolong walk'. Such identified category significantly distinguishes this invention from other PMV and scooters.

Therefore, it should be clarified, as obvious now, that still many people have disability to the extent that they must be confined to a wheelchair (when using it) to move from place to place. These people are excluded from the group of users of this new invention, because they will not be able to use it due to sever medical condition and disability.

The technology of personal transporter means, from the old manual wheelchairs through advanced medical and leisure personal transporters and scooters, had significantly accelerated during the past two decades, to electric or gas powered transporters, slow, or extremely fast. Thus, from one hand, we recognize the "old" simple, two large wheels wheelchair, unpowered, which is still in use for many reasons, to the most advanced personal mobility vehicles (hereinafter PMV), such as the one which is known as the Segway, and others, having speed as high as 40 MPH or even more. The old, manual wheelchairs were replaced with electric PMV's, such as one presented in early days in U.S. Pat. No. 2,482,203, providing an electric scooter, followed by improved PMV's such as U.S. Pat. No. 5,413,187 from 1993. Specifically, said patent objective intended to improve heavy, bulky PMV's for use mostly by people who are confined to the PMV's and wheelchairs, when used, as the disability is severe. On the same year, 1993, a U.S. Pat. No. 5,249,636 was issued introducing yet more improvements of similar PMV's used by severely medically impaired people, as a sitting PMV.

On the other hand, the most advanced PMV, including the Segway and alike, are fast moving PMV's, requesting extreme control and balance by the rider, and often skills not many have, to control and operate such high speed PMV's. In fact, the Segway developers, after defying physic, in general, have been constantly adding improvements to the original Segway, whereby U.S. patents and applications has been known, such as one of the recent application, Publication No. 2008-0105471. However, those high speed PMV's do not make it possible for many people to maintain extreme balance and control, nor enabling driving fast. Thus, only a limited population group may be potential user for these types of PMV's, such as U.S. Pat. No. 6,431,302, and others listed later. In no way any of the persons, subject to using the invention presented here, can use any of those advanced, mostly leisure, but also commercial, PMV's.

Still dealing with prior art technology, which is used here to prove why these technologies and these apparatus should be excluded from use for the category of population this new invention is dealing with, the Segway and PMV's alike show a common characteristics and features which are extreme backdraws and bear adverse results compare to the new invention presented here. Note that the most common used electric personal transporter for those people with total inability to walk, or with prolong walk limitation, is known as an "electric scooter" or "electric wheelchair", AKA, PMV, normally a three-wheel vehicle, extremely heavy, relatively inflexible, and complicated to handle. See for example U.S. Pat. Nos. 4,570,739; 4,750,578; 4,947,955. Note that these type of PMV's have been constantly subject to improvements and patent filing, so that even in 2009, a Publication 2009-0255747 provided yet another improvements, as a standing PMV, to be discussed later.

In addition, Segway, like other fast moving PMV's, became more as a commercial transporter used by professionals such as police officers, security guards and mail carriers, or by sport lovers, who use such PMV's for leisure. This is critical distinguish for the purpose of the new invention to be fully addressed in the summary portion.

Therefore, in advancing the technology era, more patents were issued for such advanced PMV's, such as U.S. Pat. No. 6,302,230 B1, which was generally invented by the same group of inventors of the Segway. Said latter patent presents an automatically balancing vehicle with a headroom monitor, which determines velocity differences with alarm, producing a warning when the headroom falls below a specified limit.

Since fast moving scooters in the category of the Segway became attraction for inventors, other similar Segway's were invented for the same purposes, such as U.S. Pat. No. 7,192, 040 B2 by a prominent Chinese engineer, Mr. Shouvhum Xie. [It should be stated, with great pride, that Mr. Xie was kind enough to assist in making the first prototype of the invention presented here.] Said patent U.S. Pat. No. 7,192,040 provides Segway type improvements, one of which is rocking structure with the first portion and the second portion rotating around an axis; However, it serves as the same purpose as the other types of such vehicles, or scooters, with high speed. The point is that numerous improvements of this category of PMV's should not undermine improvements of standing, three-wheel PMV for use by a different category of people, and by different usage and purposes.

In further developments and added features related to the prior art, several patents were issued for features of other PMV's, which, despite the patents granted, simply show more disadvantages, such as portable heavy PMV's (mostly related to PMV's used by people confined to wheelchair (when used), who need to use electric PMV's for transportation, and also need to load and unload such PMV's to places such as a trunk of a vehicle, a buss, an airplane, ramps and trucks. If any of such PMV's claim to be portable or collapsible. For example, one advertisement of such PMV's for handicap people shows the PMV's taken apart to five or six major parts, whereby each part weighs between thirty (30) to fifty (50) pounds, claiming "easy assembly and disassembly", or "easy loading and unloading" onto to a car trunk. Well, note the driver is basically a disabled person. Said is similar to the vehicle described in U.S. Pat. No. 4,570,739.

These types of PMV's, mostly used by severely medically impaired people, include accessories to operate the scooters, such as front steering wheel, steering handle, switch, steering column (main column connecting the handles to the base), front wheel mount, motor, control box, base platform, rear wheel(s), suspensions and axles. Note again that none of these scooters can be used for the purpose of the scoter subject to this new invention.

In comparison to the high speed scooters, mote personal mobility vehicle, U.S. Pat. No. 6,176,337 B1, which is generally a handicap scooter with three wheels, whereby a person with limited mobility sits on a chair, and drives the scooter, in a slow speed. For those reasons and intended usage, such category scooters are labeled as personal mobility vehicles with front and often rear chassis, having all elements of making the scooter drives powered by a battery, an electric motor, and steering handles.

Nevertheless, all of these scooters (or personal mobility vehicles) are heavy, cannot be disassembled and assembled, and even if some do, as cited here, each part is very heavy, complicated, and makes the transfer of the scooter onto a car trunk or any other place impossible by one person, especially that those PMV's are made and intended for people with disability.

In addition, in the category of such scooters and personal transporter, it is fair to mention some folding electric scooters, such as U.S. Pat. No. 7,077,229 B2, and U.S. Pat. No. 7,451,848 B2, which are generally folding portable scooters, which, by other patents, may have two (2) or three (3) wheels. For such scooters, folding them does not change the weight and the limitation already described for all other scooters, in addition to being high speed vehicles. In fact, those are disadvantages to be discussed in the summary part.

Years later, U.S. Pat. No. 6,176,337 introduced, in fact, same type of PMV for people with disability, having dual chassis, with emphasize on a chassis and seat locking means. Again, improvements of such PMV's for such specific usage is limited to the population targeted, which is not the group of people the invention presented here suggests. Therefore, the conclusion is that, despite efforts, none of the patents provided substantial multiple improvements in one PMV to make it ideal for use by the population targeted by the new invention.

For these and other reasons, this new invention is aimed to resolve and responds to numerous disadvantages of the prior art, presenting multiple novel, significant advantages and improvements a one single PMV, which makes the invention presented here the most revolutionary, and the utmost standing personal mobility vehicle for millions who need to use it.

Those people are not aware of the existence of such vehicle, thereby they are not able to enjoy its efficiency, and make their livelihood much better. This subject is broadly discussed in the following part of the SPECIFICATION

SUMMARY OF THE INVENTION

In one embodiment of the present invention, it is provided a standing personal transporter vehicle for carrying a person, whereby the person operate the vehicle while standing.

It is therefore one object of this new invention presented here is to construed and present a three-wheel portable, extremely lightweight electric battery-powered personal transport vehicle, or PMV, having extremely high mode of operation.

In a related embodiment, the present invention comprises of two major front and rear parts, extremely in light weight, whereby a third part, lightweight, may also be distinguished being removable.

In a related embodiment, a further objective of this invention is to present said two major parts of the vehicle which, being extremely lightweight, can be loaded, unloaded, transferred, or moved onto or into any place such as car trunk, buss, train, home and airplane.

In an alternative of said embodiment, and a related one, the present invention is technically comprises of four parts: First, a roughly half upper portion of the front part up to the end of the steering column. Second, from below the steering column to the front wheel. Third is the rear platform assembly with the rear wheels. The fourth part is the removable battery pack which includes the battery, battery housing and the electric connection. Each of these first, second and fourth parts weighs no more than nine (9) pounds, and the third part weighs less than seventeen (17) pounds, something was never seen in the history of PMV's for such PMV, for such purposes.

It is another object of this new invention to present a newly developed method connecting mechanism and means based on the telescope box fit concept, applied the first known time to a PMV. Said assembly comprises of a receiving telescope box fit square tube and a respective corresponding overlay sleeve type telescope box fit square tube of a slightly larger ID than the OD of the receiving tube, to be inserted over the receiving respective tube part.

It is yet another objective of this invention to present an PMV having, probably the first time in PMV's, a unique method and mechanism of foot (pedal) lever based hydraulic brake assembly, activated by a slight move (versus depressing mode) of the driver's foot of the brake lever installed on or beside the platform of the vehicle.

It is further objective of this new invention to introduce a bandsfree', leverless steering handle, comprises only with a throttle, which is a significant improvement and safety mean, whereby the driver has free hands normally used to apply on a clutch or hand brake lever, that is in most, if not all existing PMV's and scooters alike. This also may be the first time such concept has been introduced in the area of PMV's.

It is an additional objective of this invention to provide a vehicle with additional, front brake assembly, in addition to the rear hydraulic brake assembly.

In the preferred embodiment of this new invention, it is presented an electric vehicle with an electric chain motor, whereby the speed is determined by two sprockets positioned on the front major part of the vehicle, enabling stability, front drive with full force to move forward with the back load, as an easy front wheel drive, with selected speed, which is, preferably slow.

In yet a related embodiment, a hand brake lever for a front wheel brake may be installed to enable use of the front wheel at non-emergency times, whereby a simple, speed reduction may become necessary in a populated areas, in a flat ground, without the need to hold both hand firm, gripping both steering handles as in an emergency situation.

It is also another objective of this invention to present, in the preferred embodiment, a standing only, chair-less, personal transporter vehicle, whereby the driver stands on a middle of the platform, and control and drives the vehicle using the front steering leverless handle, whereby the platform of said vehicle has no seat or seat assembly.

In yet a related embodiment, it is presented here an electric mechanism combined of simple outlet and a plug for connecting the battery to the electric motor, and, using same method, connecting the battery pack (battery housing and the battery) to the platform based electric plug.

It is still another objective of this present invention to provide a vehicle which can be assembled and dissembled in seconds (less than 7 seconds.)

A further objective of this new invention is to present a low speed vehicle enabling controlled slow speed.

An additional objective of the invention presented here is to introduce an extremely lightweight personal transporter, maneuverable in tight quarters, readily adapted for indoor and outdoor usage, and easily able to negotiates over barriers, sidewalk, curbs, stairs, whereby it can be moved around by one hand of a person, enabling perfect steering agility and operative convenience and a function of being able to turn around or to sides at the original point at diameter of less than 50" (Fifty inches 0, or to get over sidewalk, stairs, ramps, bumps extremely easily, especially in narrow areas such a hallway.

In conclusion of the some of the objectives of this new invention, it is presented here a personal transporter vehicle which combined 'all in one' features no other PMV had presented, making it the novel, utmost, the most efficient, most useful and most comfortable PMV for the group of population described herein.

Thus, more than half dozen main characteristics (and features) of the new invention presented here, all combined together—and which are explained more broadly below—make a significant change and improvement in the currently known PMV's, for the purposes and population and potential users presented herein.

Referring now to the purpose of the invention presented here, it should be noted again that millions of people have difficulties to walk long distance, labeled as having limited prolong walk, or having total inability to walk at all. However, all respective population for this purpose can stand. In this category are millions who have medical conditions and problem such as of osteoarthritis, knees, hips, feet, heart, diabetes, pulmonary difficulties, overweight, and other medical conditions, to name some. In here, these people are included in a 'walking inability' category.

The major issue addressed here, subject to the new invention presented here, is not only physical, but also mental and emotional, which are some of the major reasons why a person with walking limitation or inability would not use a PMV on a daily bases, and instead, preventing himself or herself—at least in part—from enjoying the free movement and livelihood, and fulfill the utmost pursuit of happiness.

This is critical, because the invention presented here, based on its many combined features—exactly responds to these problems, and provides the answer and the help (i.e. scooter needed) these people need so much and so badly.

Another reason is that, other than PMV's such as the Segway and alike, mentioned here earlier, and which will be addressed later, for all these people, it is out of question to use a sitting PMV, such as the know 3-wheel electric scooters, or electric personal transporter vehicles and/or scooters, for many reasons. That is, even if such sitting PMV's, with or without standing feature, may be the best one ever invented, with all features possible. Simply, these people will not sit on a wheelchair, or wheelchair type PMV On the emotional-mental subject (barrier)—the key term here is 'PRIDE', as sitting in such PMV's designated, in principle, for people with severe disability, confined to a wheelchair or alike, is out of question for millions, as shame plays a big part in that.

The other reasons including that there is no PMV which is extremely easy to use, simple, light in weight and safe, and which provides a standing feature rather than sitting. Standing on a safe and efficient PMV, facing people straight, leveled with all, brings the pride back to the users, who can stand, but cannot walk, or who cannot walk prolong. Thus, this is a key element associated with this invention, as an improved PMV, along with other features. That is in addition to people losing confidence in the existing PMV's.

However, it is recognized that some PMV's enable standing feature, and some are also for stranding only, but there is exactly where this new invention is superior, and shows and provides "all in one" new, lightweight, easy to use, efficient and portable PMV, which all these potential users can use with pride, or, as the inventor's trademark phrase states, the new PMV enables the person to "Stand 'N 'Walk' Proudly™". (™ by Joseph Tsiyoni, Shairon Int'l. Trade Co.).

Therefore, the invention presented here, is a pride rescue for all these people, who now have the opportunity to gain their life back, and to 'walk' around as equal individuals without the unspoken embarrassment and shame involved, which keep those people inside, rather than outside. Testing of the prototype in that respect was extremely successful, resulted range of raves, including extensive praising and applauses.

In that respect, it is obvious that when a person is standing leveled with others, the person's pride is back, there is no shame, no hesitation to be out, and there is feel of inequality, and, in fact, as the testing experience showed, even some fun, since, as ironic as it may seem, it is possible to enjoy the "walking" with this PMV to the surprise and pleasant reaction of thousands, based on the testing experiences.

To simplify the description, and noticing the two major parts, a better understanding provided by the attached FIGS. 2, 3, 4, which are the three units included in the first front major part of this invention (which, if the platform and rear wheels are ignored, is seen in FIG. 1 [without the banana-shape leg]), and FIG. 8, which shows the second (rear) major part of the new invention.

It should be noted that in review of dozens of previous art descriptions of issued patents, it is clear, with utmost modesty, that this may be the first time that the specification of a patent is written in the most simple plain and clear language, well described and illustrated, that even those who are not skilled in the art can understand the nature and details of this new invention.

Now, that the objectives, purpose and background of this invention have been laid out, the following provides a summary of the invention more broadly, citing what it provides, with respect to its numerous significant improvements, and with respect to previous patents and existing PMV's.

Subsequently, the industry is starving to provide a rescue vehicle to millions who—for many reasons described here—cannot, and will not use any other vehicle described in the prior art, especially those sitting vehicles, and that is a fact. These millions need a new concept and revolutionary vehicle, combined 'all (features) in one', to make their life easier, and their usage of the novel vehicle comfortable, efficient, easy to operate and maintain, easy to assemble, disassemble, load, unload, transfer and store, move in specific narrow spots, enabling the driver to move from place to place regardless medical limits, and with pride.

Going forward, this brief is now presented broadly, combined with previous arts.

Accordingly, this new, extremely simple and lightweight standing only vehicle comprises of two major parts—although, physically and technically, it comprises of four parts—each one extremely light in weight, whereby—as an additional advantages—a "regular" person, although with walking inability, can move the PMV around with one hand, easily and safely.

Because of the mechanism used in this new invention, and its structure, one is the front part comprises of the steering column, a steering handle, a chain motor, a control box, a front wheel, a fork assembly and part of a telescope box fit assembly.

(Major) Part A

The first major part of the new PMV presented here is the front wheel assembly comprising of a leverless dual steering handle (as one unit) mounted on the steering column, which may be of a strong material such as steel or metal tube or pipe. The steering handle comprising of left and right control handles, whereby an accelerator—throttle is fastened over one handle side to control the speed d of the scooter, being connected to a drive—which regulates the energy supplied from the battery—via an electric wire inserted into an extended hose, going down to the motor and control box along, or it may inside the column steering thus being electrically interconnected to the battery.

In related embodiment, said hose may include a wire connecting an ON/OFF button assembled on the steering column.

Yet in a related embodiment of this invention, a non-emergency brake lever and a front wheel brake may be installed respectively on the steering handle and front wheel.

The vehicle steering column extended down, and ends at generally about the middle of the front part, whereby a two-part hinge assembly mechanism connects the steering column to the lower portion of the front part, semi-permanently, with a secured bolt with a lock-nut, enabling folding and unfolding the upper portion which comprises the steering column and the steering handle. There, an additional safety pin (security locking pin), such as eccentric locking cam lever secures connecting assembly when there is no need to fold the upper portion.

Thus, although generally unused, and most likely potentially for purposes suchg as shipping or maintenance, the first major part is physically and technically made of two sub-parts.

There is a dual purpose for having this folding mechanism in the middle of the front part. First, extremely easy and fast, it can be folded down for many purposes, such as loading into a vehicle, place, home, airplane, or just for storage.

Second, the folding mechanism enable taking the upper portion of the front part away, for purposes such as shipping, storing and maintenance, to name some.

From the connecting assembly, an extended leg, preferably a banana-shape leg, but may be a regular square tubing, and also which may be made of a strong material such as steel or metal tube, square or pipe, is extended downward a few inches above ground. A wheel support fork assembly extending downward from the tube connecting it to the banana-shape leg. The fork comprises of mounted two legs extending downward from both sides of the front wheel, connecting to a horizontal rod inserted inside the middle of the front wheel, to be mounted at the bottom of the front part and the fork, whereby the rod secures the wheel with the fork assembly. On about the middle of the fork, a control box is attached to a bar mounted on the front fork, and below is a chain motor, as the preferred embodiment of this invention. The two-part motor chain has a chain connected to the wheel through a poly attached to the wheel, enabling powerful front wheel carrying the back load.

In yet another embodiment of this invention, said chain motor may be replaced with an electric motor installed in the front wheel, powerful enough to serve as front wheel drive to carry the back load. As the technology advanced, such a small motor is absolutely enough to move the scooter forward with a big load of a rider. This embodiment makes the maintenance of the PMV presented here even more efficient.

In yet another embodiment of this invention, a key locking mechanism may be assembled on the electric motor to enable the driver to lock the vehicle whenever it may be necessary.

Still summarizing the major front part of the PMV presented here, referring now to the lower section of the main, front part of the PMV, in the preferred embodiment, a special, two-part connecting assembly mechanism is applied to connect the two major parts of the invention into a complete vehicle.

The mechanism, based on the telescope box fit assembly, comprises of two major parts. The first part of the assembly, here as the recipient square tube assembly, is mounted to the lower end of the banana-shape, extended backwards supporting column leg, extended from below the steering column of the scooter, facing the driver.

The front part of the telescopic mechanism is described here. the second part is described in the rear section. Thus, the front telescopic box assembly comprising a generally U shape, which, as an example, is made of three metal square tubes, but which may be in any other form or material such as a round tube, or made of one molded piece. Said U shape part is mounted with one side on the lowest end of the banana-shape extended column leg, mounted on a base tube, thereby a third square tune is mounted on the outer side of the base tube, parallel to the first tube, facing the rear platform, but extending vertically, several inches higher than the ground. Said last backward metal tube serves as a receiver part of the telescopic assembly.

(Major) Part B

The second major part of the PMV introduced here is generally the back (rear) of the vehicle, or the chassis assembly, AKA platform assembly, for carrying the person who drives the vehicle. This is a simple assembly, extremely in light weight, made of simple, strong materials, enabling the user to carry the entire part in one hand, easily.

Said major part comprising square platform, made preferably of light, but strong aluminum or similar material mounted on a rectangular, at least four metal square tubes, but preferably five, which also may be round tubes or in other shape. The fifth, or more tubes, support the bottom of the platform.

An axle is mounted on the rear metal tube part of the metal frame of the platform, whereby the two ends of said axle are inserted, each one respectively inside a rear wheel. The platform is used for two purposes:

a. To install a moveable battery pack which comprises a battery housing and battery;
b. To carry loads, mainly to enable the person driving the PMV to stand comfortably and drive the scooter.

The rear also comprising a connecting means to connect the battery pack, comprising of a battery and a battery housing and electric connectors, enabling easy removable of the battery pack in a tiny up pull. The battery is located generally in the upper middle part of the platform, enabling the rider to post his foot on both sides of the battery, standing comfortably. The battery has a small electric outlet, similar to the one to be mention later installed don the telescope box fit, which is inserted over a plug positioned on the platform, which is connected to the motor with a wire going through the banana-shape-leg. This is a simple technique which has been used before, to connect two parts, but here, it is used in the combination of several features which make a significant difference, such as the simplicity of the assembly of the two major parts.

In another embodiment of this invention, said battery pack (the battery and the battery housing) may be installed anywhere on the scooter, such as on the extended banana-shape leg.

The new invention also provides, probably the first time in PMV's used for this purpose, a hydraulic foot brake assembly, whereby each hydraulic brake is formed inside each respective rear wheel; two respective brake hoses are extended under the platform, to be connected to a foot brake (pedal) lever, formed on the surface of the platform, for the use of the driver.

According to the preferred embodiment of the invention, said hydraulic brake lever is formed at the far left or right of the battery, ready for the driver's foot to touch it lightly to activate the hydraulic brake for both wheels.

Alternatively, the brake lever, or a pedal, may be vertically installed extending out of the platform, similar to passenger vehicles.

This revolutionary concept of a hydraulic foot brake, and foot brake lever formed on the platform revolutionized the concept of driving a PMV, while both driver's hands are free to grip the steering handle in any situation and condition, control the PMV better, and avoid roll over or other problems. The lever enables the driver to stop the vehicle, through both rear wheels, instantly, by a light touch of the foot.

Yet in another embodiment of this invention, the hydraulic brake may be connected to the steering handle, whereby a brake button is formed on the handle, enabling the driver to stop the scooter by pushing the button.

Referring now to the telescopic box fit assemble, and more specifically to its rear part, said rear part comprising, as an example, two metal square tubes, generally formed in a shape such as ], whereby the longer (right) part demonstrated here is mounted to the front platform frame, and the other tune is extended downward, vertically, also higher than the ground. This is the 'sleeve' type, to be inserted overt the corresponding 'receiver' tube of the front part of this assembly, thereby completes the interconnecting of the two major parts of the vehicle, the front wheel assembly, and the chassis assembly, thereby the complete vehicle is ready for a drive. Note that this rear connecting part may be made of either square or round tube, or with one molded piece. Also, it should be obvious, again, that the ID of the sleeve part of the telescopic assembly is slightly larger than the OD of the corresponding receiving tube of the front part of the telescopic assembly. To assemble the vehicle, this tube with a larger ID, serving as a sleeve, is inserted over the receiving tube mounted under the banana-shape extended column leg mounted on the front wheel assembly, thereby completing the interconnection between the two major parts of the vehicle, making it ready to drive in the fasted time, less than seven seconds.

Applying the telescopic box fit assembly concept, in such manner in PMV's, which most likely was never used before in such PMV's, makes the vehicle presented here revolutionary by many aspects.

It changes the concept of portable vehicles, and makes other methods obsolete also because of the extreme light weight of the PMV itself, and each part separately. Moreover, it makes the assembly, disassembly, loading and unloading a matter of seconds, easy, with little force.

Part C (in the Alternative)

Potentially, for reasons, a third part of this new invention, which technically is the fourth removable part—is the removable battery pack, comprises of the battery housing and the battery.

Part D (in the Alternative)

With regards to the two sub-parts of the major first part of the vehicle 9 front wheel assembly), a dual-hinge mechanism is used to connect the two said sub-parts, which also enables folding the upper sub-part in seconds, or, as stated earlier, to separate both sub-parts from each other. Such function would be rare.

Thus, the major parts described herein show a standing, portable PMV which can be taken apart, assembled and re-assembled, each time in a few seconds. Further, it is so easy to handle or lift even in one hand, that the user is able to move it around, or back-wise or side-wise easily, in a narrow places.

In conclusion of this part of the summary, it is obvious that, regardless any other patent or previous art, the combination of the following features, elements, methods and improvements is sufficient to convince that this is the utmost, super revolutionary, novel and the most innovating personal transporter vehicle for the population described here:

Extremely lightweight, portable, liverless steering handle, quick and easy to assemble and disassemble, two major parts, extremely lightweight, newly applied telescope connection method between the two major parts, rear wheels hydraulic brake, foot brake (pedal) lever, motor chain controlling the speed by two pockets, stand-up only PMV, chairless, electric method of supplying power and connecting between electric parts, super fast transfer onto and into places, loading and unloading, extremely easy to turn around, to sides, and finally, having it "all in one" PMV, all which enables the driver to easily maneuver it in tight quarters to each direction in narrow areas, in a diameter of only 50 Inches (!), being able to negotiate over barriers, sidewalk, curbs, stairs, whereby it can be moved around by one hand of a person. Although it may not be necessary to do so, in light of the overwhelming advantages of the new invention presented here, it is respectful, as part of the process to challenge the prior art—some of which have been previously cited, whereby the next part of this summary is dedicated to.

With respect to the new invention being leverfree, or tandsfree', this is a significant advantage and improvement, and probably a new concept in PMV's. While the safety advantages is discussed in a separate part, not that U.S. Pat. No. 7,192,040 provided "a handle frame" and "breaking grip", whereby the driver must use to stop the vehicle. Using the hands in such manner and applying force on the fingers may divert the attention and control of the driver, especially at times of emergency.

With respect to this new invention being a standing vehicle (only), note U.S. Pat. No. 6,378,642 from 2002, which introduced a three-component (parts) scooter, and a removable seat enabling the driver to stand on the platform. The description of said patent seemed to be—at a time—revolutionary, or significant improvements, until the practical facts, some which are described here, and some were not clear in the specification, were analyzed.

First, this is a three-part (or components) scooter, whereby each part weighs much more than the entire weight of the invention presented here, while the new invention consists of two major parts, both extremely lightweight. That can be noted just by looking at the first figure of said patent. In addition, the issue of a chair in a scooter or PMV, although removable, was good maybe to get a patent, or to enable a driver to stand for a short time, but by many standards, and the medical condition of the users of that category of scooter, it is huge burden for many reasons, including transfer of the scooter, loading and unloading, taking into airplanes, busses, or even putting onto a car trunk.

Additionally, the assembly of the three parts is different than the assembly of the new invention, for the technique used here, i.e. the telescope box fit, which affect the stability, efficiency and operation of the PMV, as well as ultra speed assembly and disassembly, of two major, extremely lightweight parts. For example, a scooter known as SNR by EV Rider has the similar features, most likely based on said U.S. Pat. No. 6,378,642. This NSR, as an example, has a battery which weighs 40 pounds, a few ponds more than the total weight of the invention presented here, which, again, is considered as "all in one PMV. Similarly other component of that scooter weighs almost as much, or more, than the PMV presented here.

Returning to the concept of inventor of this new invention, whereby many patents were granted, but provided features unique to only specific usage, another example of such irrelevant innovative features is a US PUB 2009-0255747 introduced in 2008. Said vehicle introduced is, in fact, the opposite of the invention presented here. Said application provides a commercial-type vehicle—even if it attempted to insinuating a PMV—with all elements of commercial vehicle such as a massive assembly of chassis, large extrusions, extremely heavy battery pack—estimated at 40 Lbs—more than entire weight of the PMV presented here), relatively heavy front assembly with dual steering bars, and other components. In fact, said vehicle, by its nature, must have two rear shock observers, especially for having trailing assembly, bumper, and other heavy and complicated components. For example, the publication provides a vehicle whereby a (heavy) battery pack, including a 12 volt lead acid battery and a massive, complicated electronic assembly compare to the simple, tiny electric connection provided in the invention presented here, whereby the weight of the battery is less than 2 pounds. The method of electric connection is different, although both are removable. Also, said vehicle claim a stabilizer bar intended to reduce sway "normally associated with a three-wheel vehicles", a feature which is inapplicable to PMV's such the one introduced in this invention, but in more commercial and different types of vehicles. In addition, although not required, still said publication does not disclose the speed, which is estimated at 15-25 MPH, and not the usage and population intended to use said vehicle, which are assumed strictly commercial.

Without dealing with whether this is an improvement, note that, for the reasons cited earlier, no suspensions are necessary for the invention presented here, which makes the entire PMV more efficient, easier to handle and maintain, all which reduces the cost of production and maintenance.

Further, said application of the stand-up vehicle provides a folding handle bar, which is a known feature, while unless used in substantial improvements as suggested by the inventor of this new invention presented here, are meritless.

Most importantly, in comparison to the large number of innovative features provided in this new invention presented here, it is obvious this is still the utmost, most novel and most innovative stand-up personal mobility vehicle presented so far.

Finally, for this section, concerning said publication 2009-0255747, it appears, with the issue of limited information and description provided that this is a fast moving commercial vehicle, whereby the folding portion applies on a heavy dual steering column for loading purposes, but the entre vehicle, by description, weighs much, is not portable, and is made of one bulky unit. Also, although it provides the feature of standing on the platform while driving. Therefore, none of the person included in the category of the invention presented here would drive or use the vehicle suggested by said publication.

With respect to two-wheel vehicles, in the category of the known Segway and alike, it would not be necessary to largely discussed the PMV's related to the category of two-wheel, because, as stated earlier, those are generally for leisure, being high-speed vehicles, requesting different types of usage and control. None of the targeted population for the invention presented here would ever be able to use any of said PMV's without risking life.

With respect to maneuvering and flexibility to overcome barriers previously described, said two-wheelers are not an option, but other three—wheel vehicles claim advantages presenting the same. For example, Pub No. 2007-0045014, introduced in 2007, is part of the innovative maneuverability, as a focus of PMV improvements and invention.

That is practically an electric wheelchair with all disadvantages of such, which mostly is used by people with limitations, who are confined to wheelchairs, when using it. It is agreed that maneuverability is an important part of using a PMV; however, most of inventions claims similar improvements, when practically, they have not achieved the maneuverability of the invention presented here.

While front wheel drive is also credited to maneuverability, note U.S. Pat. No. 6,199,652, which provides a front drive wheel assembly, with emphasize on the transmission containing within a gearbox. It does not contribute to the improvement of the maneuvering of the present invention, but, rather, shows it complexity, and yet, relatively, inflexibility. The drive assembly, w
ith its arms swinging configured with shock absorbers to absorb mechanical shocks between the wheel clearly shows this is a different type of PMV, regardless the aspect of front drive assembly.

Note also U.S. Pat. No. 5,121,806 from 1991. It claimed advantages over U.S. Pat. No. 4,570,739 which is cited here, which suggested reason to grant a patent; these includes claim that said '806 patent provides more maneuvering, which is limited in Patent '739, as claimed having longer wheelbase and susceptibility to side-to-side tipover" due to the small diameter wheels that are generally employed in their manufacture".

It has been already demonstrated that the present invention provides superior maneuvering over these, and all other PMV's, which the exception, maybe of the Segway type (which cannot be used for the population targeted in this new invention). Thus, accepting that better maneuvering capability justifies merits, the superiority of the present invention, along with other many advantages makes this new invention the star of all PMV's (for the purposes stated.).

With respect to the assembly and disassembly features, whereby numerous US patents have been granted, it should be stated that the portability of PMV, through numerous inventions and patent is subject to a misconception, which now, for this application, can be finally clarified.

Assembly and disassembly capability should be measured by the outcome of the feature to distinguish and differentiate between the practical use of such feature, and the efficiency and contribution to the group of people using such vehicles. Indeed, U.S. Pat. No. 6,176,337 granted in 2003 introduced a PMV "which can be easily disassembled, transported and reassembled for use, even with one hand."

Said patent also cited the problem with scooters needing tools to manipulation of the many components of the PMV's, which, as it claims, is time consuming or even completely impossible for a physically challenged person, particularly when the person has limited use of a limb, such as is often the case for stroke victims. Therefore, it is obvious that while this patent relates to resolve this problem, it is, in fact, suggesting having a chair in PMV's and making numerous components and part removable. It is possible that said patent, or its principle, has been resulted in a PMV, or similar, introduced by the pride mobility company (which may be involved rather in U.S. Pat. No. 4,570,739 mentioned below.)

One respective PMV, mostly used by people with severe limitations, weighs 260 pounds, and according to the company website, it can be taken apart to five "smaller parts", assuming lightweight; However division of 260 by five means each part weighs almost 20 pounds more than the total weighs of the PMV presented here. It is therefore unnecessary to mention the size, weight and 'trouble' of, and having a seat.

Combined with other advantages of the present invention—knowing that said capability of disassembly relates to those other heavy, bulky PMV's, made for different usage— such feature of assembly-disassembly of those patents cited here, and others, is most likely, practically unused, and remain theoretical, and absolutely cannot be used by the group of population subject to the new invention, who in no way would use any of these PMV's subjects to those patents.

Further, in said patent, the claim of holding each part with "one hand", while still citing drivers as people who have lost limbs or have medical inability to carry parts contradicts the purpose of that patent, whereby it highlights the advantages of the invention presented here. Because said claim means that the driver must sit as he or she deals with severe disability. In other words, practically, the claims granted patents, but are mostly impossible to apply.

Note also that U.S. Pat. No. 4,570,739 issued in 1986 also addresses this issue, using mechanism for attaching parts enabling assembly and disassembly. Said patents indeed, relates, as in this new invention, to persons with partial and total walking disabilities, which are included in the category of population this new invention aimed to.

However, that patent attempted to resolve the problem PMV's having components weighing more than 30 pounds, and, claiming being compact, the PMV, it cited, is conveniently separated into components for lifting onto a trunk of an automobile or placement in another vehicle for transportation to other sites.

As previously stated here, with so many parts, and a huge seat, such option remains theoretical, or practical only when it becomes extremely necessary and important to separate the components (disassembly), as in an earlier paragraph, the patent cited that the "component parts which are light enough to be easily lifted for placement in an automobile trunk for transportation to other sites of use." That is while in another earlier place the same specification cited reference to "persons with partial and total walking disabilities".

By stating so, these two patents, although provided PMV's which can be taken apart for numerous parts, show, in fact, that the weight of only one part is almost the same weight of the PMV presented here, and such feature is absolutely not practical.

In addition to the PMV's type, note also U.S. Pat. No. 6,475,578, which presents the idea of disassembly feature of a claimed PMV, which is, a "cart that can be dismantled into light weight parts". However, this is more related to commercial cart, rather than to PMV or vehicle those used by people with disability. Generally commercial cart, it has luggage carrying arms on the front wheeled support, it can be used as a dolly with or without power from the battery too many parts, complicated, still each part is probably more than 30 Lbs. including seat. This cart also has a fifth wheel, which makes it in a different category of PMV, differentiate from the invention presented here.

The above analysis makes it easier to deal with a 1990 U.S. Pat. No. 4,947,955, which introduced "take apart" vehicle, having dual rear and front frames. Even after two decades, further improvements of said patent failed to provide the utmost, most useable novel PMV, which this invention is providing. Note that said patent '955 relates to two elements, introduced as three:

A vehicle readily disassembled into several components; two frame sections, readily disassembled and assembled, and a detachable connection between several frame sections. As being a vehicle used by severely medically limited persons, yet the components are extremely heavy, and even after years of modifications by other patents, including U.S. Pat. No. 6,371,235, this problem has not been resolved until this invention provided a revolutionary PMV.

As an example, the U.S. Pat. No. 6,371,235 provides "easily removable components" of a collapsible vehicle. Given the fact that this vehicle, such as all of its type, as used by people who, when using it, are confined to the vehicle for medical reasons. Therefore, the heavy parts (or components) do not make any practical sense other than getting a patent for the feature of taking part s away that "may be conveniently stored and carried within a carrying bag." That is why, again, how this features is applied in a different manner, in practice, and size of components than the invention presented here. It should be said that this invention present the utmost usage of such features, as well as others.

Thus, said features still characterizes the same area of improvements, whereby providing disassembly into more parts, each patent for a different part of the vehicle. The drawbacks will be described later. Therefore, while many people are reluctant to use such heavy, bulky, complicated wheelchair-type PMV, as previously described, it is yet another advantage of the invention presented here to respond to such need of many people to use a new mean of transportation with the features and many advantages presented here.

With respect the brake (pedal) lever, note that while this invention cited using a brake food (pedal) lever probably the first time in PMV's, it should be indicated that "foot pedal" was claimed in a different aspect in U.S. Pat. No. 6,343,667. There, it is introduced in a different connotation, methods and usage, especially comparing to the 'old', traditional pedals and concept, referring to a brake or a clutch foot pedal. As much as this patent was granted, also for introducing a foot pedal while the concept of foot pedal, as cited for vehicle is that old, so introducing a foot lever in the concept and means introduced in this invention worthwhile such consideration as an improvement with merits. In said cited patent, the 'pedal' is simply a large, bull type, round means installed on the frame, whereby the driver depresses it to turn the motor on. Note that these types of scooters are normally skateboards types with battery-powered electric motors, which are fast, request extreme control, and probably some bravery to drive so fast. These are not in the area of the present invention, and absolutely not for the use by the type of population cited in this application for this new invention.

With respect to the electrical assembly, the invention presented here provides a simple, ages old and known concept of outlet-plug connection, which is applied here for many reasons, including simplicity, efficiency and productivity. This would be response to another invention filed under US PUB No. 2008-0261435. There, a complicated electric connection guide assembly was introduced to resolve numerous complicated electrical issues involving brakes, electrical motors power supply components, whereby the entire patent was devoted to that matter.

While said patent did resolve some important electrical connection via the assembly provided, here, in this present invention, the electrical connection is simple, and, in general out of the scope of said patent cited here.

Therefore, the electrical connection used in this present invention has been in use for years in many electric PMV's. Therefore, as previously stated, while this patent is solely for electric assembly, the electric connection provided in the present invention is one of many features presented in one invention.

The above summary, which broadly presented the new invention in comparison to prior art, and its significant advantages, makes it obvious to understand the manner in which this new innovative and novel PMV operates. However, to make it extremely clearer, and to show the practical many features involved, the following last section of the summary part demonstrate the practical use, whereby the reader may feel he or she is driving the new vehicle while reading.

In Operation

A. A Telegraphic Version

In less than 7 seconds, the driver holds the banana-shape leg of the front wheel assembly, (which is raised above the grand due manufacturing assembly); then the driver slightly lifts and aligns the end tube (sleeve) mounted at the end of the second part of the telescope mounted on the platform, and inserts the former tube inside the latter tube formed on the platform part. Then the driver stands on the platform, and using the throttle, starts driving.

This shows the beauty and extreme efficiency of the novel, utmost PMV, which will bring life to millions.

B. Detailed Version

In operation, while the back platform 40 assembly lays on the ground, having the bottom of the respective part of the telescope box fit sleeve-type tube 48 facing down, the driver holds the banana-shape leg 36 of the front wheel assembly, (which is raised above the grand due manufacturing assembly); the driver slightly lifts the end tube 48 (sleeve) mounted at the end of the second part of the telescope mounted on the platform 40, and aligns it with the corresponding tube 37 mounted on the end of the banana-shape leg 36, and insert tube 37 inside tube 48, to make the interconnection between the front and rear major parts of the vehicle final, thus making it a ready to drive complete vehicle.

While such connection is made, the driver notices and ensured that the electric assembly comprises of the outlet 96 and plug 95, respectively, attached to the two parts of the telescope assembly, are inserted to make the electric connection (because the electric outlet is already attached to the receiving tube, and the plug, attached to the sleeve part). This function takes less than seven (7) seconds because the ID of the tube (sleeve') 43 insertion is larger than the OD of the recipient corresponding telescope tube 37, it is quick, easy and efficient.

In other words, soon as the two corresponding telescope tubes 37 and 48 join together (inserted), at that point, plug-in 95 and outlet 96 are affirmatively joined together and coupled for electrical continuity between the front and rear major parts of the PMV, thus assuring electric support from the battery. This is a simple electrical assembly, which is based on outlet-plug concept to connect and deliver electricity.

The driver is now ready to start driving, whereby gripping the left and right steering handles, utilizing the steering column controlled by the steering handles 20, using the throttle to increase and decrease the speed.

However, to make it much clearer, is should be added that, when the appropriate embodiment applied, and an ON/OFF button 26 is installed on the steering handle 20, the driver pushes the button to "ON", then grips the steering handles 21 and 22 by holding throttle 21a and handle cover 22a, aims direction, and start gradually turning the throttle 21a to accelerate the speed from zero up to under 5 MPH.

Also note that here, it was assumed that the battery pack (housing 41a with the battery 41) was not removed, and was already positioned on the platform 40. Should it becomes necessary, the drive needs to simply place the battery pack on the respective top on the platform 40, and give it a small push to secure it.

Note that if the driver decides to use the locking safety pin to secure the two parts of the telescope box fit assembly, the driver simply insert the locking nut through the respective and corresponding holes 45 and 38a assembled on all necessary walls of the respective tubes.

Now, the PMV is ready to move with the turn of the power. At this point, also unlikely, but as an option, should the battery pack (housing 41a and battery 40) has been removed, the user now places the battery pack on the generally middle place of the platform 40, on the designated area, whereby both the housing and the platform 40 has electric outlets and plug thereby they connect as the user places the battery pack on the platform 40.

This simple assembly, ("super-sonically" speed), makes the driver want to use such vehicle as being the fastest assembled ever, easy to put onto car trunk, taking inside the house/office, place, and to any place, to mention some of the previously stated advantages.

C. Driving

While driving, the user may approach places like side walk, and curbs. These are easy obstacles to pass with this new invention for a few reasons. First, because the scooter has light weight, and has three wheels, the driver simply steps down, gives the scooter 10 a tiny push, or slight lift, or a move, whichever is appropriate, and continues by standing again and driving. In addition, in order to make a complete turn (back), this new invention makes it extremely easy like never seen before.

Because it's small size and weight, and good maneuvering and stability, turning vehicle 10 on almost the same spot is obvious and easy, at no more space than fifty inches (50") radios to make a full circle turn. This is another beauty feature of this invention. The space required to make such turn is just as narrow as the average holeway of a house.

Additionally, even if there is no room to make a turn, as it has been practice and proven successfully long before filing this application, when the driver steps down, it takes less than 3 seconds to turn the scooter around with one hand, simply quickly and safely. At worst scenario, the driver moves and turn the scooter easily and simply, without applying almost any force (In terms of force measured by pounds, it would be less than 10 pound force, at most).

D. Stopping

Although this has become obvious even to one not skilled in the art, based on the description of the function of the brake (pedal) lever) 90, stopping the vehicle 10 has become, thanks to the hydraulic brake system used in PMV probably the first time, a matter of instant stop. Simply, since the brake lever 90, in the preferred embodiment, is located on the bottom of the platform 40, whenever the driver wishes to stop the vehicle 10, all he or she has to do is to move the foot extremely slightly and touch the brake lever 90.

Because the brake is hydraulic, both wheels 50, 55, and therefore front wheel 60 stop simultaneously, unlike mechanical brake, which may experience problem stopping both wheels simultaneously. It is important to note again that the maximum speed of this new invention is under 5 MPH, so at any event, stopping the vehicle would be extremely simple, easy and safe.

Driving and stopping this new invention brings a new technique and extreme safety and simplicity for reasons previously described. Also recall that the steering handle 20, in the preferred embodiment is liverless. That enables the driver first, to have full control over the scooter, with perfect grips of the left and right handles 21 and 22. This does not have or forced to use only one hand, or used most fingers of the second hand push brake lever, such as in the other embodiment, which is lever 23, as it is done on the PMV, or, for other types. Second, Similar to passenger vehicles, the driver has an option to use a brake lever 90 installed on or besides the platform 40, using his foot.

Third, as another advantage of this scooter in operation, and because the inventor has significant experience is safety matters, including transportation, the structure of this new invention enables what probably none of the existing scooters does: In case of need to stop urgently in downhill, not only the hydraulic brakes does the function, instantly, if necessary, but the driver can turn the vehicle 10 to left and right on the same very spot without going to much to left or right. Thus, turning the vehicle 10 to left or right, then continuing to either direction, or uphill, is an extra feature which, for emergency, will be a great advantages over all existing scooters or PMV's, whereby none can perform in such manner because of their structure, weight, size and other limitations, with one exception, which is a huge disadvantages:

As presented earlier, there are other three-wheel PMV, although not portable, which can make a similar maneuver, but not exactly. However, those scooters, or PMV/s are with the capacity of high speed for scooter, which would be more than 15 MPH. In such speed, such maneuver may be catastrophic.

E. Disassembly and Transferring

In order to disassemble the vehicle 10 presented here, it means generally to separate the front major part of the wheel assembly from the back major part platform 40 assembly. This is even a faster function than the assembly. As a reverse procedure, the driver holds the banana-shape leg 36 in one hand, and simply lifts the platform 40 assembly up (holding the respective telescopic assembly via tube 48, and positions it on the ground, while taking the front major front wheel assembly part, still held in one hand, to the car trunk or anywhere else.

This process, proven in thousands time using the prototype, takes not more than seven (7) seconds. (The separation—disassembly).

However, if the driver used the locking safety pin (unseen here) to lock the connecting assembly of the telescope box fit, means through the holes 38a and 45, than the driver shall remove said pin first. However, the assembly is so secured and safe, that most of the time, especially for short trips, the driver does not need to use the safety pin because of the physical and load pressure of the rider on platform 40, which secures the connection even more, when the driver stands on the platform 40.

In addition, should the driver decides to remove the battery pack (housing 41a and battery 40), the drives simply slightly pulls the housing 41a and removes it.

In accordance with these and other objects which will become apparent hereinafter, the instant invention will now be described with reference to the accompanying drawings

DETAILS DESCRIPTIONS OF THE PREFERRED EMBODIMENT

Figure 1:
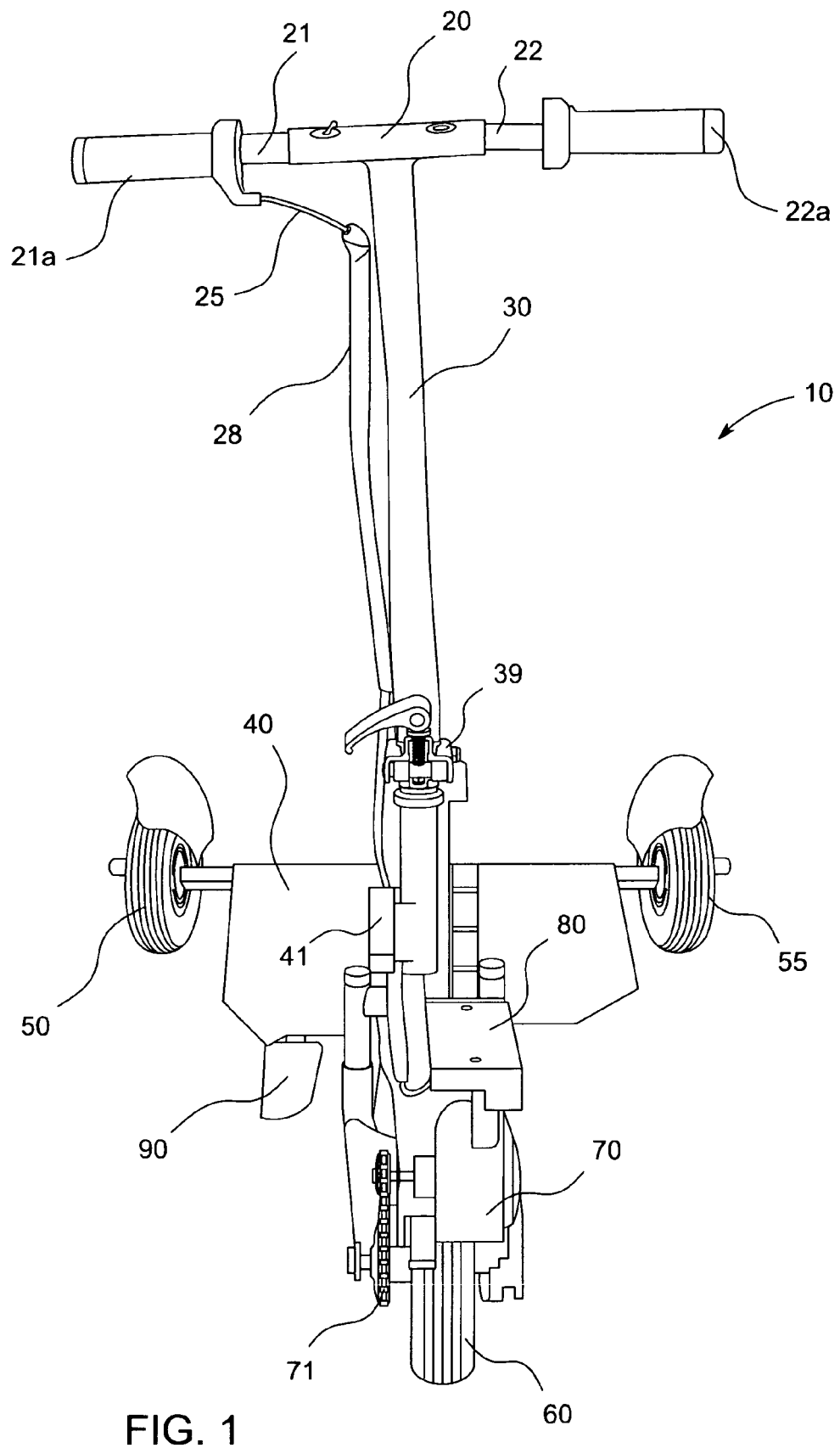
FIG. 1 is a front perspective view of the electric personal transporter vehicle-scooter of the present invention.

This new and improved invention is a generally portable 3-wheel electric personal transport vehicle (personal transporter vehicle-scooter 10) empowered by a battery, a leverless steering handle, an electric motor, a connecting assembly between the two main parts of the PMV suing a telescope fit concept/mechanism comprises of a receiving and sleeve telescope fit tubes with respective ID/OD, a unique method and mechanism of hydraulic brake assembly operated by a light move of the driver's foot of a brake lever, whereby said PMV can be assembled and disassembled into two or three parts in seconds, whereby the entire PMV, and so each of the three parts are in extremely light weight, which can be carried, together, or separately, by one person, or each by one hand. More Specifically:

FIG. 1 is a front perspective view of the electric personal transporter vehicle-scooter 10 of the present invention shows a front perspective view of an electric personal transporter vehicle-scooter 10, showing the preferred steering assembly 20 in the very upper portion as one unit, mounted on the steering column 30; Said steering handle 20 comprises of a left handle 21 whereby an accelerator—throttle 21a is fastened over (at left of drawings), being connected through a wire 25, inserted in hose 28, to a drive control box 80, which regulates the energy supplied from the battery 41 via an electric wire 25. A right handle (of drawing) 22 is covered by a plastic cover 22a.

Going down along steering 30, it shows an accelerator—throttle wire 25, extended and inserted into hose 28 attached to and along steering column 30; (however, wire 25 and/or hose 28 may be inserted inside steering column 30 as an option), whereby hose 28 is going down toward an eccentric locking cam mechanism showing a central hinge assembly bolt 39, where is the physical end of steering column 30, (to be explained later), but practically, it is just a pin used to lock or unlock the folding feature of the steering column at that height whenever necessary. See the folding assembly in FIGS. 3, 4, 13, 14.

Figure 4:
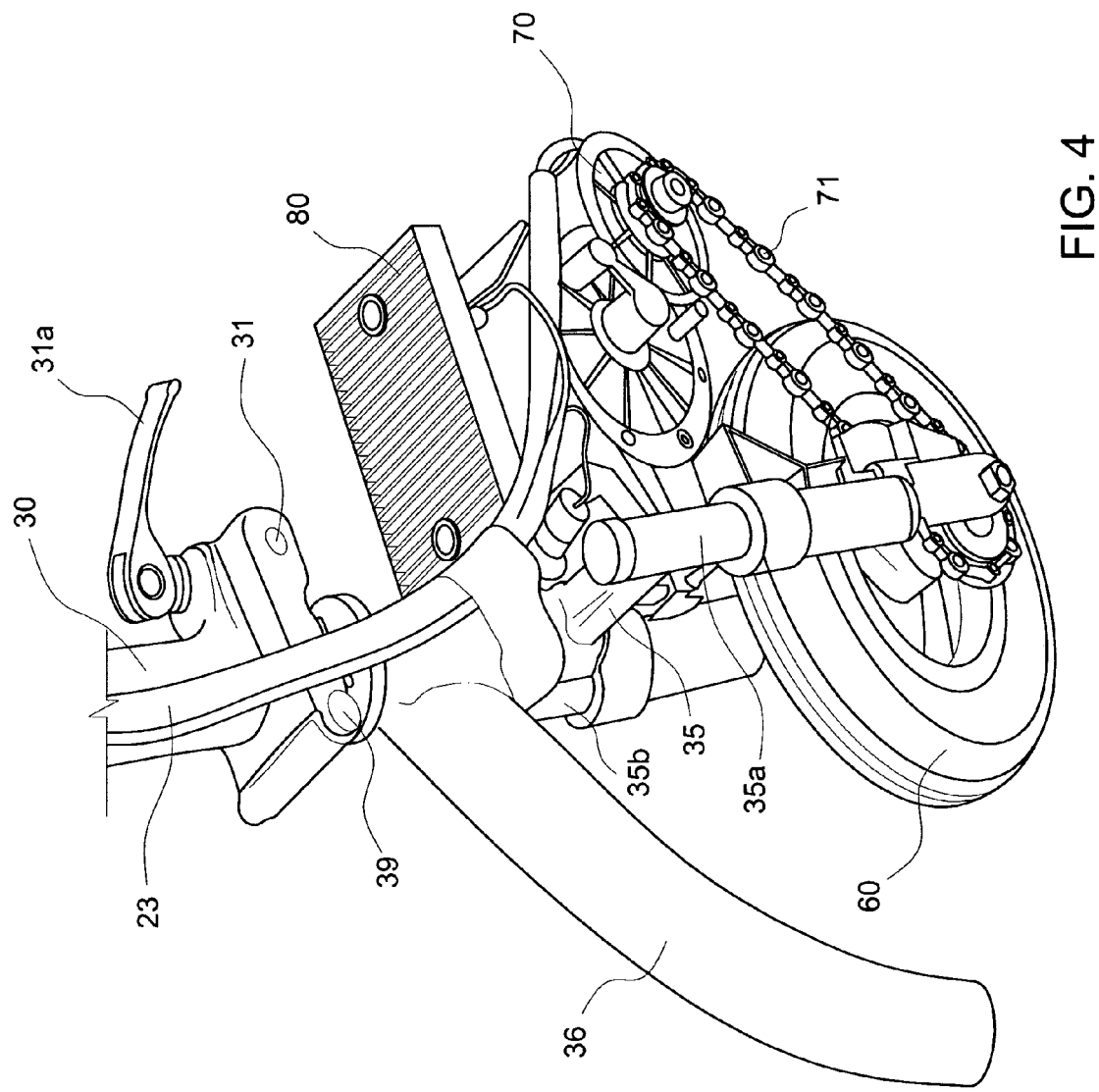
FIG. 4 is an exploded sectional side elevation view of front part of the personal transporter vehicle-personal transporter vehicle-scooter 10, from the end of the steering column, the extended leg column (banana shape), the control box, the chain motor, to the front wheel assembly.
Figure 9:
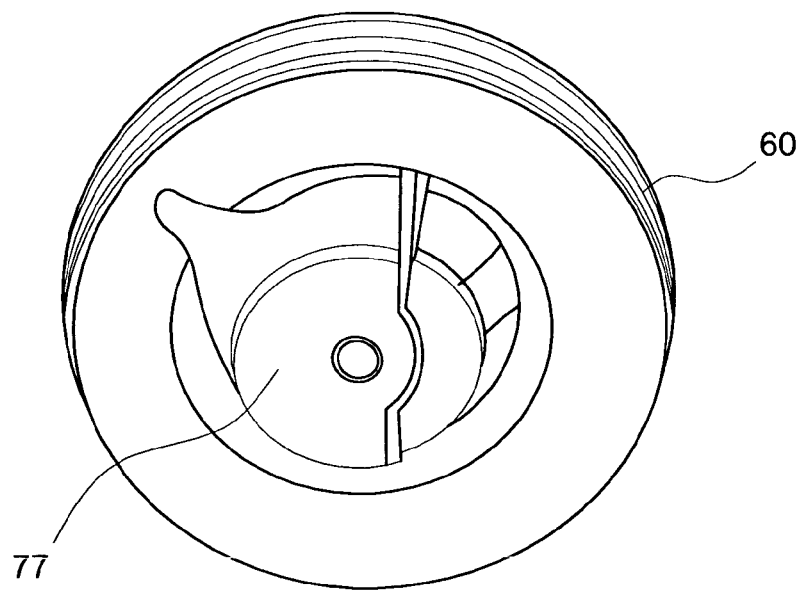
FIG. 9 is a side view of an alternate embodiment of the electric motor installed in the front wheel of the personal transporter vehicle-scooter of the present invention.

Said hose 28 is connected to power control box 80, (better seen in FIG. 4), and electric motor 70 (better seen in FIG. 4; however, see changes at the end of this paragraph). Being a chain motor, notice that while the motor is actually unseen under "motor" 70 (but seen clearly in exploded in FIG. 4), chain 71 connected to front wheel 60. Note that this is according to one embodiment of the invention. However, in another embodiment of this invention, said motor 70, receiving a new number, will be changed into a wheel motor 77 installed in the front wheel 60, as seen in FIG. 9. The description of FIG. 9 later relates to this preferred embodiment.

Thus, as we proceed to the lower portion of FIG. 1, it generally shows the floor platform 40, which is made of extremely light weight material, such as thick aluminum, however strong enough to carry the loads. Also seen are the very front (forward in the figure) and the left side (on figure) of an electric battery 41, powerful enough to supply power for a long time (seen just behind steering column 30. Note that the battery and its housing are better seen in FIG. 9. On a vertical imaginary line starting from the front wheel 60 forward, the battery is located just along such imaginary line 'behind' the steering column 30, in the middle of the platform 40, seen here partially extended to the left in the drawings. On both sides of platform 40, notice rear wheels 50 and 55, and motor 70, showing only its upper cover. A control box 80 was mentioned earlier.

FIG. 1 further showing a 'representative' of the hydraulic brake system, which, along with other features altogether, make this new personal transporter vehicle-scooter 10 a revolutionary and probably the most improved and successful one for the usage it was designed for.

Therefore notice foot brake (pedal) lever 90, which is seen extended horizontally relative to the platform 40, from the left portion of the platform 40. The foot pedal hydraulic system is better seen in FIG. 8, as a special and important part of this invention. That is in mind while foot (pedal) lever 90 being located, and extended from the platform 40, it is only according to one embodiment of this invention, while the preferred embodiment shows the foot (pedal) lever 90 located on the platform 40.

Figure 2:
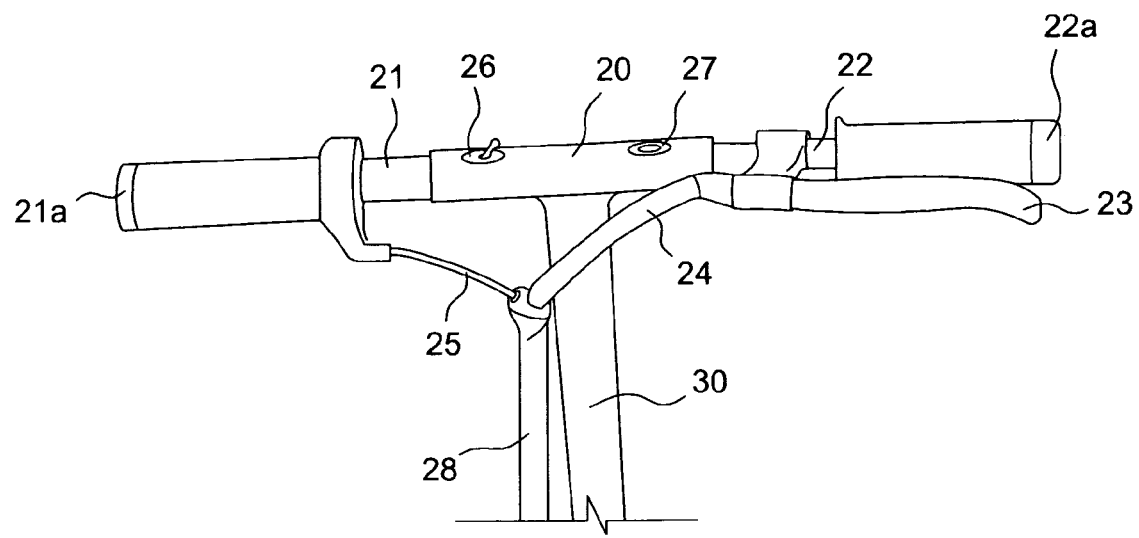
FIG. 2 is a sectional front plan view of another embodiment of the steering assembly.

Referring now FIG. 2, it shows an alternative embodiment whereby steering handle 20 comprises of left handle 21 and right handle 22 (when looking at the figure), an "on-off" button 26, a brake lever 23 with its brake cable 24 inserted into hose 28, and an additional brake control button 27, as an alternative push-button method, which electronically stops the personal transporter vehicle-scooter 10 from moving when properly pushed. Practically, in this embodiment, the use of the hand brake lever would most likely be for speed reduction at a very low speed driving, in a flat ground, non-emergency as oppose to the rear hydraulic brake. E.g., when driving in populated area, among people, and there is need to reduce the anyway slow speed, without the need to hold both hand firm, gripping both steering handles as in an emergency time. Thus, while this represents only an alternative method, the preferred embodiment is based on the foot brake (pedal) lever 90 seen in FIG. 1 and FIG. 8.

As one of the advantages of this new personal transporter vehicle-scooter 10, attention is called to the fact that, in the preferred embodiment, as it is illustrated in FIG. 1, the horizontal steering handle 20 has no levers, which, being lever-free, making it a "hands free" personal transporter vehicle-scooter, thereby enabling the person who rides this personal transporter to enjoy free hands used to control the personal transporter rather than practicing endless finger movements, thus making it yet another important advantages of the invention presented herein. Thus, having full control of the personal transporter vehicle-scooter 10, the rider has more stability; his mind is not destructed by debating which left or right lever to use should a stop is needed, knowing that a small hand movement of accelerator-throttle 21a will slows the personal transporter vehicle 10 down, or stop it, or accelerate, whichever is appropriate.

Note that previous PMV's failed and became dangerous because the front brake lever installed on the horizontal steering handle caused the front wheel to stop, whereby causing rollover, such as it happens to bicycles, a much known problem. Therefore, the present invention focuses on safety and stability of the rider thanks to the hydraulic brake system installed on both rear wheels, activated by a simple touch of the brake lever, to be described in the appropriate section below.

In addition, because one of the chief purposes of this invention is for people with physical difficulties, "hands free" concept is crucial, such as for people who are not able to apply too much pressure on hands or fingers, or joints, or people who do not have enough strength or sensitivity in hands.

Further, note that although the maximum speed of this personal transporter vehicle-scooter 10, is limited to 5 MPH, maximum safety can only be achieved, when, in emergency, it is not safe to move hands or fingers to apply pressure and pull any lever, a task which may make anyone confused and unsafe.

Figure 3:
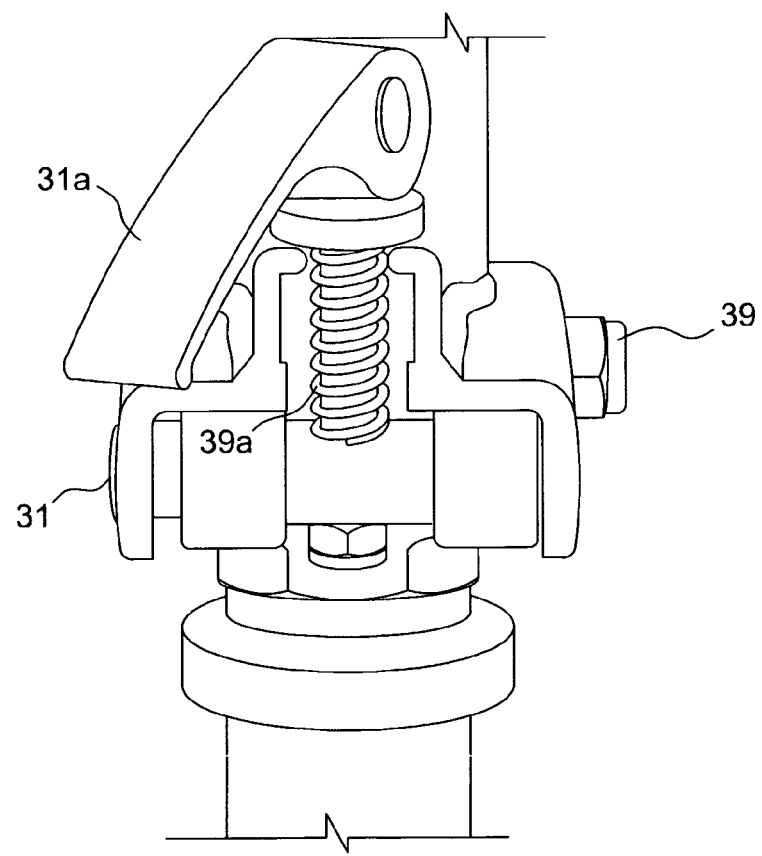
FIG. 3 is an exploded sectional front view of the folding assembly of the steering column, connecting the steering column, an upper sub-part of the wheel assembly, to the lower sub-part of the wheels assembly through a hinge mechanism of the personal mobility vehicle-scooter of the present invention.

FIG. 3 shows a folding hinge base mechanism comprises of an eccentric locking cam having its central bolt 39, seen here the bolt head, (lock nut is unseen here), the locking handle, lever type 31a, and central spring 39a, the "push-in-out" locking (hitch) pin 31, (whereby a spring is inserted in to enable 'push-in-push-out) here seen pushed out after it was pushed in to enable easy and fast folding and unfolding the two sub-parts of the wheel assembly. The bolt 39 is being semi-permanently locked, ensuring the entire front wheel assembly is straight and safe, because it would be rare to release it to take the steering column assembly apart, an option and another advantage of this vehicle. This mechanism is supported by a ring-bolt 39a. This part of the personal transporter vehicle-scooter 10 symbolizes the end of one portion (steering column & its assembly), and beginning of the second portion, which leads to the next figure.

FIG. 4, which is a peripheral side of the lower portion of the new personal transporter vehicle-scooter 10, shows the steering column 30 ends at the safety mechanism with its eccentric locking cam safety lever 31a (here, as an example of a locking pin type), at "lock" position, a bolt 39, semi permanently locked with a lock nut (unseen here) end a of safety "push" locking pin 31 inserted in a "lock" position (extended slightly out- It looks like a hitch pin, but has a spring inside to enable locking position). The figure also shows the previously described steering column 30, and the hose 28 going to the motor 70 through the control box 80. The motor chain 71 is seen between the motor 70 and the wheel 60.

Note also central hinge assembly bolt 39 which is semi-permanent, secured, enabling the front part of personal transporter vehicle-scooter 10 to fold easily by releasing safety locking pin 31 through handle-lever 31a. Because central hinge assembly bolt 39 is more secured, with a locknut unseen here, it remains such unless there is need to take this upper portion of the personal transporter vehicle-scooter 10 out, i.e. from top to the bottom of steering column 30. Then, it is necessary to remove the locking bolt central hinge assembly bolt 39 and its locking nut (unseen in the figure).

This FIG. 4 also shows the extended motor 70, which is, in one embodiment of this invention, a chain-motor, whereby the number of sprockets dictates the speed of the personal transporter vehicle-scooter 10, whereby here, the new invention has a speed limit of less than 5 MPH.

This chain motor 70 here is seen with its upper and lower portions, (which, in FIG. 1, are 'hidden" under 'motor 70' cover) and motor chain 71. Further, the figure shows an extension to column 30, which is a banana-shape leg 36, which is hooked to the unseen (here) platform 40. To complete the structure, note fork 35 extended beneath column leg 36, said fork having with two "legs" 35a and 35b. These two legs 35a and 35b are extended and connected to both sides of front wheel 60.

It should be noted that, as seen in FIG. 9, in another embodiment of this invention, motor 70 is eliminated, and a wheel electric motor 77 is installed in front wheel 60.

In addition, as it may be obvious, a key lock safety switch may be installed by the control box 80 or the motor, in another embodiment, to enable the user to lock the vehicle when not in use.

Figure 5:
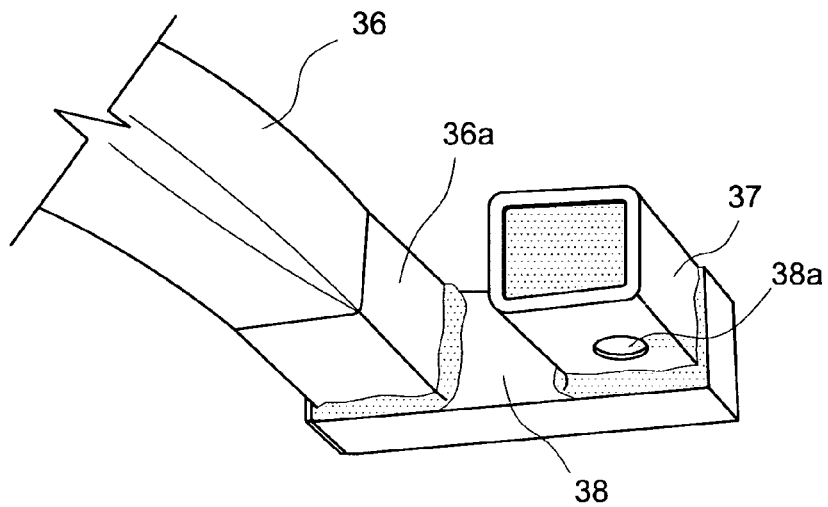
FIG. 5 is a top and side elevation view of the lower portion of the banana-shape extended steering column, showing the one part of the dual part telescopic box fit assembly, in generally a U shape, going upward.
Figure 6:
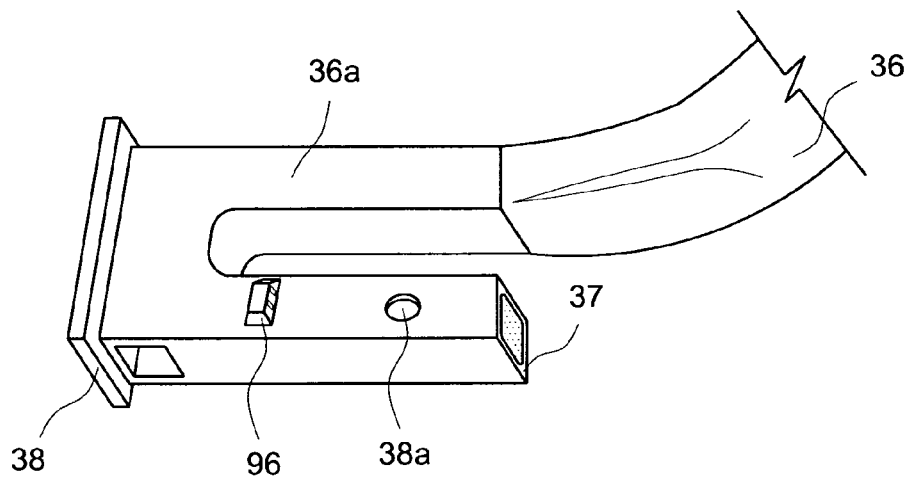
FIG. 6 is an exploded side elevation view of FIG. 5, showing the end of the extended steering leg and the first part of the dual part telescopic box fit assembly, in generally a U shape, the U shape made of one part (if ignoring the base tube).
Figure 7:
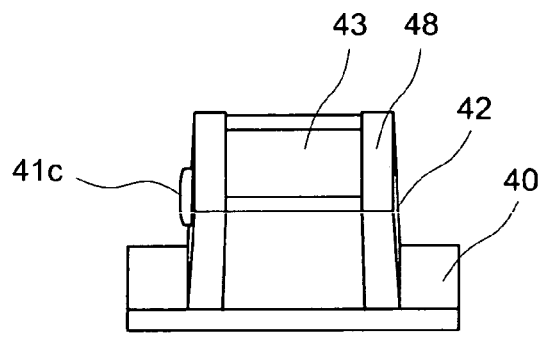
FIG. 7 is a bottom elevation view of the second (rear) part of the telescopic box fit assembly, a sleeve-type, with its opening side facing downward, for overlaying the corresponding first telescope fit receiving part, to connect the front and rear major parts of the personal transporter vehicle-scooter.

FIGS. 5, 6, 7: A telescope fit box assembly:
Referring now to the connection mechanism of this new invention, note FIGS. 5, 6, and 7, which show said assembly in details. Thus, in describing the point of connection between the two major parts of the personal transporter vehicle-scooter 10, i.e. between platform 40 assembly 40 (and its frame—FIG. 1) and the front assembly of the front wheel 60 and steering column 30 (also FIG. 1), which is attached to the banana-shape leg 36:

Note the following for these three Figures:
a. The leg, introduced as "Banana-shape leg" can be made of any shape and any material, such as a square tubing made of metal steel and aluminum.
b. Also for FIG. 11, 12, 13:
The telescope assembly, comprises of the parts introduced and described in FIGS. 5, 6, 7, 11, 12 and 13 are in fact two unite introduced here as assembled from two and three different square tubes each, as an example. Each unit may be made of one single assembly as one part, which, in production, may be more efficient and stronger. Note FIG. 6, which shows front wheel telescope unit made of one part, although marked as three numbers 37, 38 and 36a.
c. The material of which these parts are made, as an example only, but may be of any respective strong material such as steel, iron and strong aluminum.

FIG. 5 showing the extended column banana-shape leg 36 extended to the first part of the telescope fit assembly, here the receiving portion, whereby a tube 36a is mounted vertically on one end of tube 38, whereby tube 37 is also mounted vertically on opposite end of tube 38, which is the actual tube receiving the sleeve counter telescope fit portion seen in FIG. 7 in part. Note also two open holes on tube 37 for insertion of a safety locking (hitch) pin, whereby one opening hole 38a is seen on one side.

For perceptivity of this innovative structure and concept based on the telescope box fit method, which is probably used here the first time in PMV's in such usage, note same tube 37 of FIG. 5 is also in FIG. 6, as an exploded view.

FIG. 6, which is an exploded side elevation view FIG. 5 (an extended steering column 30 to a banana-shape leg 36 with its telescope fit [receiving] assembly], which shows the banana-shape leg 36 mounted to tube 36a, whereby both tubes 36a and 37 are mounted to tube 38 on both ends, respectively, making it the one mounted portion of the telescope box fit assembly. While FIG. 5 shows an example of said telescopic unit made of three square tubes, which also maybe be tubes or pipes, (FIG. 5, respective numbers 37, 38 and 36a), this FIG. 6 also intended to show said telescopic unit as one molded unite, made of one piece instead of three tubes, since as an option, it may be more cost effective and even stronger to make this unit as a one piece.

Here, also note an open holes on tube 37 for insertion of a safety locking (hitch) pin, whereby one opening hole 38a is seen on one side. However, the idea here is that this revolutionary concept of connecting the two major parts of the new personal transporter vehicle-scooter 10 is extremely strong even without a need for a safety pin, which is not seen here. (It will be inserted through two pair of holes, hole 38a, and 45 in FIG. 11.)

Applying the telescope box fit technique in this PMV invention, in such manner, is new, revolutionary, and, in fact, has been tested hundreds times positively and successfully. It is extremely simple: The opening sleeve part of the telescope box fit, No. 43 (in FIG. 7), drilled on tube 48 is inserted over the recipient corresponding tube 37 of FIGS. 5, 6, in seconds, with, or without securing it with a safety (hitch) pin (unseen here). This is significant because it is done extremely fast, easy, and without any type of complications. This will contribute and encourage more people to use this type of PMV.

And vice-versa: the disassembly is done in seconds, making it extremely east to use and load-unload onto any place such as car trunk.

Still in FIG. 6, note also electric outlet 96 formed on tube 37, ready to receive the plug from the battery via the corresponding telescopic part attached to the platform 40 frame (In FIG. 13), whereby both make the interconnection of the two major parts of the vehicle completes.

FIG. 7, which is a bottom elevation view of the (rear) sleeve-type telescope fit assembly, showing vertical tube 42 extended from the platform frame 40, an opening 43 of tube 48, which is actually vertical downward (seen better in FIGS. 11, 13), but here to demonstrate the opening and general structure. Opening 43, formed on tube 48 while e facing down, will be inserted over tube 37 seen just above in FIGS. 6, 5), to complete the interconnection between the two parts of the telescopic box fit assembly, thereby making both major parts of the vehicle a complete, ready to drive vehicle in seconds. The fast process is thanks to the newly applied telescopic mechanism in PMV's, because all it takes is a few seconds to assemble by lifting the base and inserting the sleeve type tube 48 over tube 37, whereby opening 43 goes over tube 37, simple, fast, easy. It is obvious, still worth to mention, that the ID/OD of the tubes 37 and 48 are respective. (ID-inside diameter; OD-Outside diameter). To complete this description, and better understanding FIG. 7, refer to FIGS. 10 and 11, while the description follows later on below.

Referring now to the attraction of this new PMV 10, its preferred embodiment which may be using the first time a hydraulic brake system with a foot lever (pedal) in a manner. A clearer view of this Fig are FIGS. 11 and 13, as this part of the connecting telescopic assembly, with its corresponding part mounted on the extended banana-shape leg 36 completes the interconnection between the two major parts of the vehicle.

Figure 8:
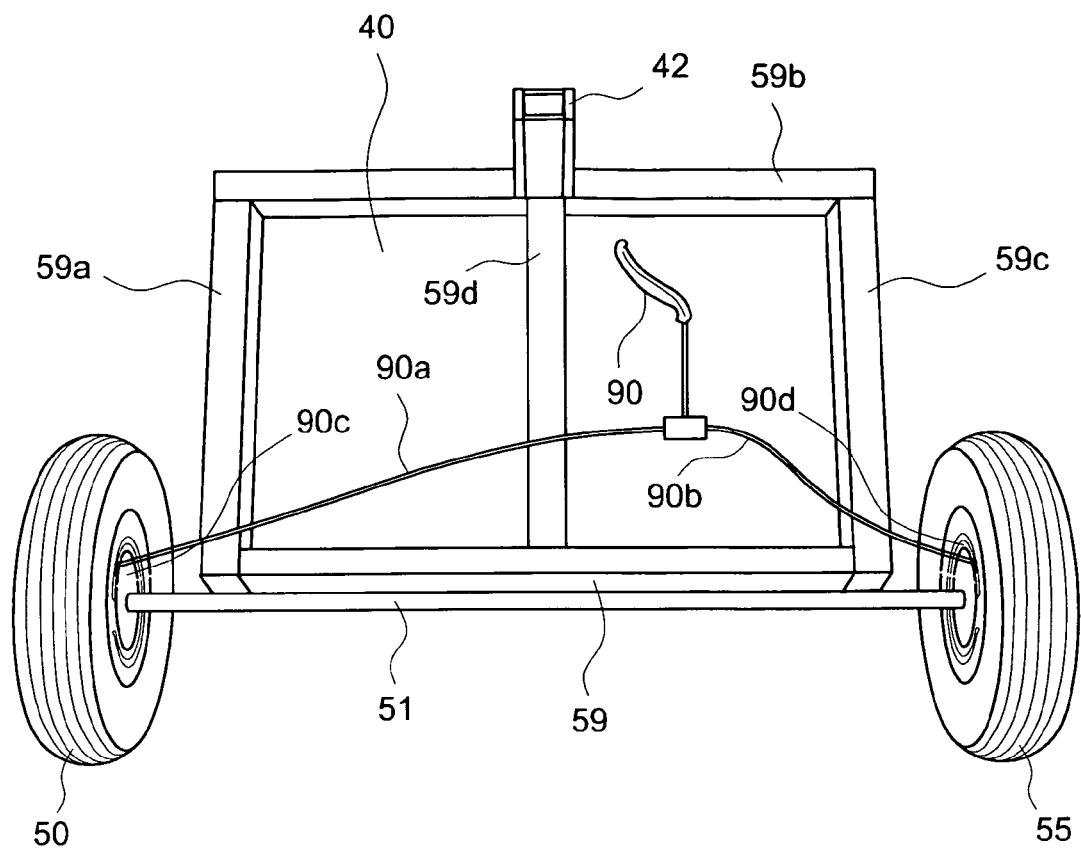
FIG. 8 is a bottom elevation view of the chassis platform, the platform and its rectangular metal frame, and the hydraulic brake assembly, here positioned on the bottom of the platform for demonstration purpose (instead on top platform, see FIG. 10) 40, showing the hydraulic cables connected to each left and right rear wheels, whereby the food brake (pedal) lever is positioned on the platform.

Thus, FIG. 8 shows the following essential and significant elements:
  a. The actual brake "pedal" (lever) would be a simple thin lever, which, by the way of example, would look like lever 23 in FIG. 2;
  b. The brake lever will be located NOT on the side of the platform 40 (as seen in FIG. 1 as pedal 90, and also, better seen in FIG. 10), but on the top of platform 40 itself, in either location, convenient for the user to apply it by a tiny, simple slide of the foot at left, or right, whichever it may be applicable.
  Note that said lever pedal 90, may be otherwise placed anywhere on the personal transporter vehicle-scooter 10, whether on the horizontal steering handle, or anywhere on, besides, along or under the platform 40, although, in the proffered embodiment, it will be placed on the platform 40, laying along the platform 40.
  c. In another alternative, a brake button 27, FIG. 2, may be installed to enable the user to stop the personal transporter vehicle-scooter 10 by pushing the brake button.

Therefore, FIG. 8 is aimed to describe the hydraulic brake system, which is simple, but powerful. Thus, although FIG. 8 is a bottom perspective view of platform 40 with the hydraulic brake mechanism, note that for efficiency purpose, the brake lever 90 is seen here for the description purpose as on the bottom of the platform 40, but, in fact, it will be installed on the opposite side, means on the top of the platform 40.

In addition, platform 40 seen here is a simple rectangular frame made of an extremely lightweight material such quality aluminum with frame metal square tubes 59, 59*a*, 59*b* and 59*c*. Platform 40 is seen extended with a tube 42 mounted to it to horizontally, enabling it to attach a tube 48 with an opening 43, as the counter second part of the telescope box fit assembly, to be inserted, as a sleeve, over tube 37 seen in FIG. 5, 6.

The hydraulic brake seen in this FIG. 8 system compromises of two hydraulic brake discs 90*c* and 90*d*, each one is installed inside a respective rear wheels 50 and 55. The discs are connected each one to a brake tube/cable 90*a* and 90*b*, whereby both cable extends and are connected to the brake lever (pedal) 90.

Thus, the beauty and the efficiency of this system and concept is that, in the first known time, a rider of this type of personal transporter vehicle-scooter 10 can easily stop the personal transporter vehicle-scooter 10 just by touching the side-wise located brake pedal-lever, normally by a tiny slide of the foot just to slightly touching the brake pedal-lever.

Note that regardless the way the brake pedal looks in the drawing, here, in this preferred embodiment of the new personal transporter vehicle-scooter 10, the shape and size of aid brake pedal 90 is like a short lever, something like lever 23 clearly seen in FIG. 2. It should be noted that said brake pedal-lever 90 may be located anywhere on the top of the platform 40, or on the sides, as seen in FIG. 1. For example, to use with left foot or right foot. Obviously, the shape of brake pedal-lever 90 can be different, whenever it is appropriate for the use of the personal transporter vehicle-scooter 10.

Further, FIG. 8 shows the support frame comprises of extended axle 51 between the two wheels 50, 55, while the extended support tubes—frame 59*a*, 59*b*, 59*c*, and the middle support tube 59*d* (seen as the middle wide rectangular, unmarked) providing the platform 40 and the loads (battery 41 and the driver) support so that platform 40 is strong and safe.

Therefore, the hydraulic brake assembly, which, along with the other revolutionary and or improved elements, as well as known features, makes this new personal transporter vehicle-scooter 10 the most revolutionary personal transporter vehicle for the population it is targeted for, and which is described in the respective part of this invention.

FIG. 9 responses to changes mentioned in FIG. 4 with respect to yet another embodiment of this invention, whereby the chain motor is changed with a small electric 77 is installed inside the front wheel 60. (Note that motor 70, in FIG. 1 and FIG. 4, is now reassigned as Motor 77 in FIG. 9.) As technology advances, this electric motor will make the operation and maintenance of the new personal transporter vehicle-scooter 10 more efficient, less expensive, and less complicated. And, as a result, the front part of the front assembly will be even lighter in weight, which is one of the most important of this vehicle.

Figure 10:
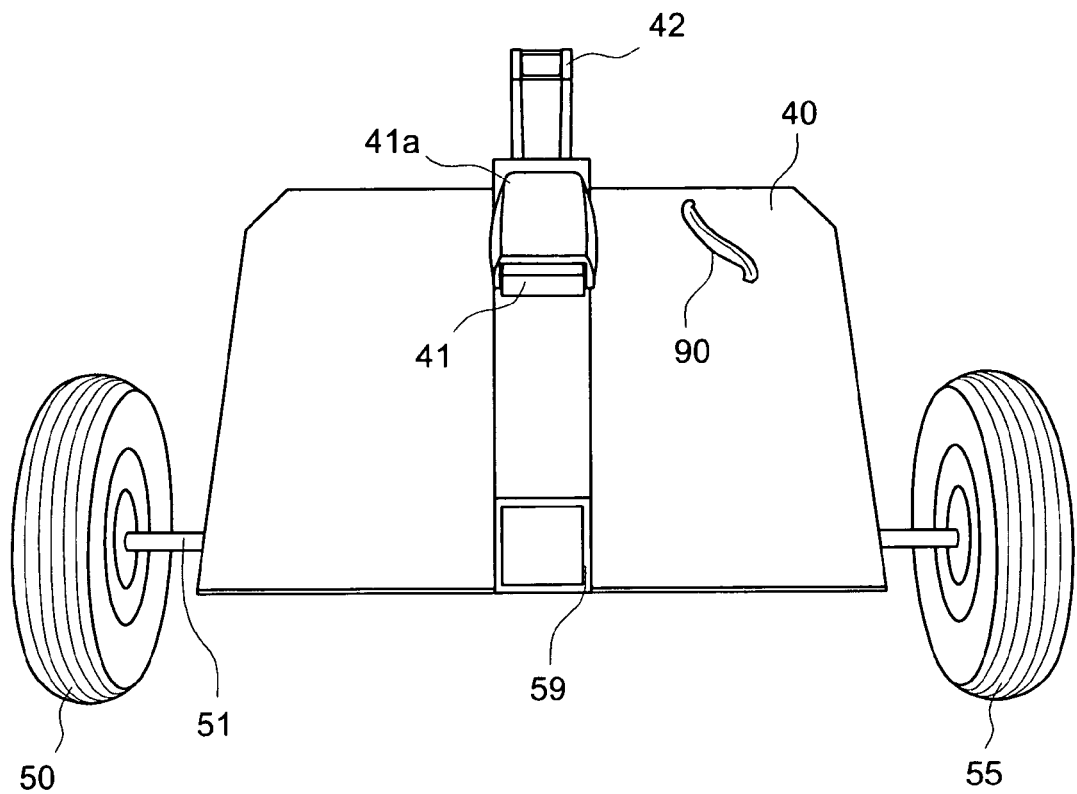
FIG. 10 is a top elevation view of the rear personal transporter vehicle-scooter chassis, showing its platform assembly, the battery pack, rear wheels, the foot brake lever, the upper view of the rear telescope fit assembly part mounted to the platform frame.
Figure 11:
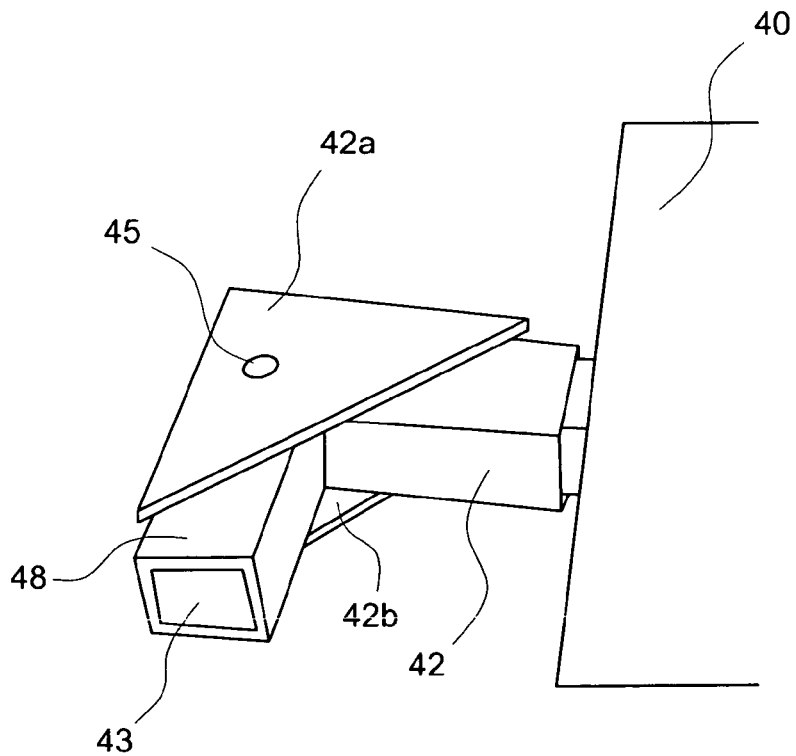
FIG. 11 is a sectional side view of the second telescopic box fit assembly connected to the platform frame, showing its horizontal tube part, the support tri-angle bracket, and the sleeve-type end tube with its opening ready to be inserted over the corresponding tube mounted on front wheel assembly.

Referring now to FIG. 10 and FIG. 11: These figures complete the telescope box fit assembly described in FIG. 5, 6, 7. In more details:

FIG. 10 is a top elevation view of the rear platform 40 assembly of PMV 10, which, as previously stated, may be made of a lightweight material which is preferably strong aluminum, but which may be of any other type of material, lightweight and strong, such as light sheet metal; the battery 41, its housing 41*a*, the wheels 50 & 55, and the (rear) sleeve-type telescope fit assembly and its parts to be described.

Thus, starting with a top view of the platform 40 with the following elements, it shows rear wheels 50 and 55 connected to axle 59 between both wheels 50, 55; a brake pedal-lever 90 located on the top of the platform 40, in this instance, at the right, to enable the driver to use it as necessary (by slightly sliding the foot to the right), which is the preferred embodiment. Note that said brake lever 90 may be placed on the left side, for left hand users, or in any other appropriate place, or at the sides of the platform 40.

Still FIG. 10 shows the top view of the second part of the telescope box fit assembly, comprising vertical tube 42 mounted to the platform 40, whereby the tube 48 mounted vertically downward with opening 43 (the sleeve) is better seen in FIG. 11.

With respect to the battery 41, it is seen in FIG. 10 inside a housing 41a represented by a frame of the housing. The housing is removable with the battery, whenever it is necessary.

FIG. 11

Note: Please recall the note posted in the section of FIG. 5, 6, 7.

FIG. 11 completes the telescope box fit assembly, as a sectional side view of the (rear) sleeve-type telescope fit assembly with its opening side for overlaying the telescope fit receiving assembly, to connect the front of the personal transporter vehicle-scooter 10 to the base. Thus, FIG. 11 shows the side view horizontal tube 42 mounted to platform 40, and tube 48 mounted vertically downward (here seen side-wise) to tube 42, whereby opening 43 of tube 48 serves as the sleeve opening to be inserted over tube 37 seem in FIGS. 5, 6, and 12 below.

Note two supporting triangle bracket on both sides of the tubes assembly, one (top) of which is seen as 42a mounted over both tubes 42 and 48, while the second such duplicate bracket on the other side is not seen in this drawing, but it tiny double line is seen marked 42b. However, this is as an example only, because, as it was demonstrated in FIG. 6, this 4-parts assembly (thereby tube 48, tube 42, bracket 42a, and a second unseen bracket 42b below] may be made of one single assembly as one part, which, in production, may be more efficient and stronger. Although FIG. 6 shows a three-tube assembly, it demonstrates, as drawings, one such unit assembly for this alternative purpose.

Note also hole 45, seen on the side of bracket 42a via tube 48, to enable insertion of a safety pin such as a hitch pin, although the PMV is safe even without it. Also, this hole 45 is aligned with hole 38a on tube 37 seen in FIGS. 5, 6, and 12 below, upon assembly.

FIG. 12

Note: Recall the note posted in the section of FIG. 5, 6, 7.

Figure 12:
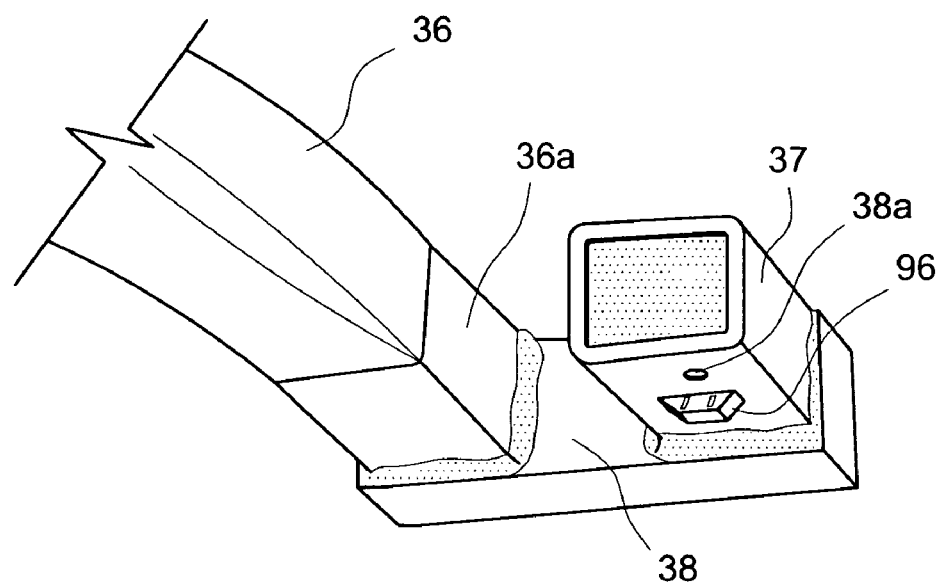
FIG. 12 is an exploded top elevation view (of FIG. 5) of the front telescope box fit receiving assembly, its base left and right tubes mounted over the base tube, and the respective tube mounted on the bottom of the supporting steering column leg, and the electric outlet formed on its upward tube.
Figure 13:
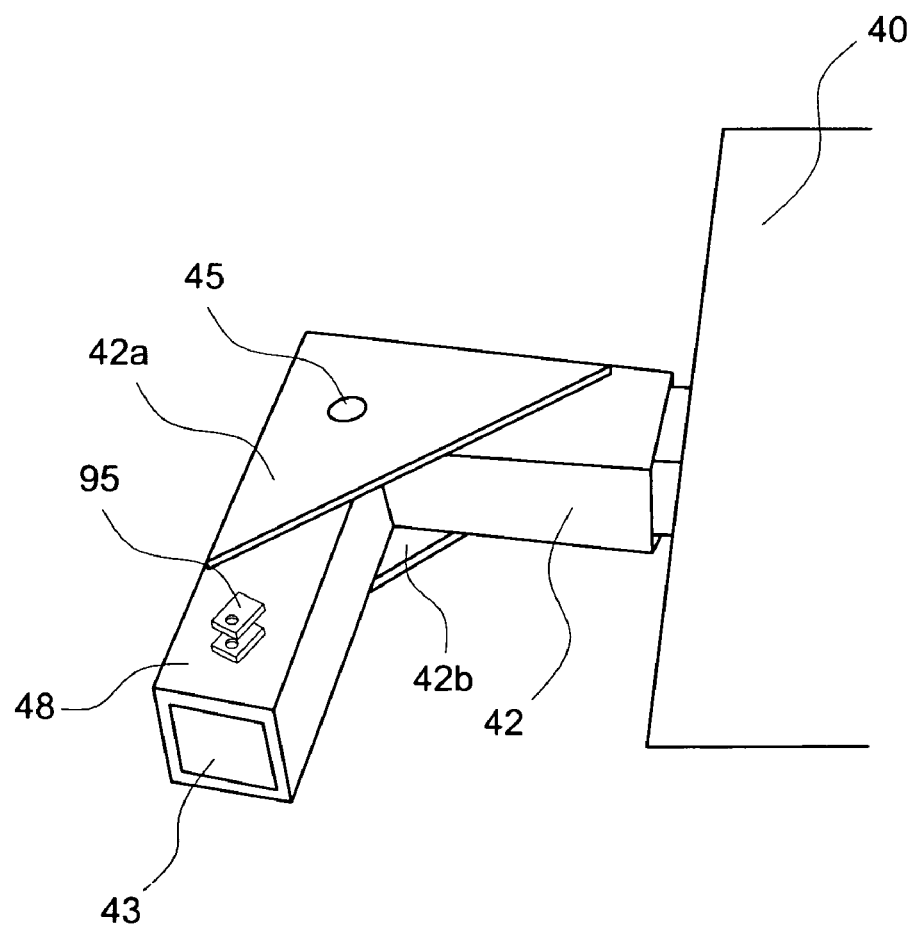
FIG. 13 is another sectional side view of the second telescopic box fit assembly connected (like FIG. 11) to the platform frame, showing its horizontal tube part, the support tri-angle bracket, and the sleeve-type end tube, and the corresponding electric plug to be connected to the outlet seen in FIG. 12.

FIG. 12 is an exploded view of FIG. 5, and is the (rear) front PMV part, attached to the banana-shape extended column leg 36, showing the telescope box fit assembly of this part, its tube 36a mounted vertically on horizontal tube 38, and tube 37, mounted vertically on the opposite side of bar 38, whereby an electric outlet 96 is installed on its side to receive the battery plug from its corresponding part seen in FIG. 13.

See also electric outlet 96 ready to receive plug 95 attached to telescope tube 48 seen in FIG. 13 below.

FIG. 13

Note: Recall the note posted in the section of FIG. 5, 6, 7, 11, 12.

FIG. 13 shows the second corresponding portion of the connecting assembly, whereby it completes both the interconnection of the two major parts of the vehicle (i.e. the front wheel assembly and the rear platform assembly), and also the electric connection between the front part of the PMV 10 and the base 40 (second part of the PMV) as follows:

As described in FIG. 11, tube frame 59b (seen in FIG. 8), is mounted to the platform 40 (nseen here), whereby the horizontal tube 42 is mounted, and extended out, whereby the tube 48 is mounted on tube 42 vertically, downright, (toward the ground), as two unseen triangle supportive brackets 42a, 42b are mounted on both tubes 42 and 48, whereby an electric plug 95, from an extended wire from the battery 41 seen in FIG. 10, is attached to the side of tube 48, ready to be inserted inside the outlet 96 seen in FIG. 12 upon connecting the two parts of the telescopic fit assembly while connecting the two main parts of the PMV 10 together.

At that point, plug-in 95 and outlet 96 are affirmatively joined together and coupled for electrical continuity between the front and rear major parts of the PMV, thus assuring electric support from the battery. This is a simple electrical assembly, which is based on outlet-plug concept to connect and deliver electricity.

Note also hole 45, which at the assembly position, aligned with hole 38a seen in FIGS. 12 and 5. for insertion of a safety pin, such as a hitch pin. To complete this description, it is obvious that electric wire(s) connects plug 95 to battery 41, being both stationed and part of platform 40 part 40. To make an electric connection, while inserting telescope tube 43 over the counter telescope part, tube 37 (in FIG. 12), plug 95 is inserted inside outlet 96.

Figure 14:
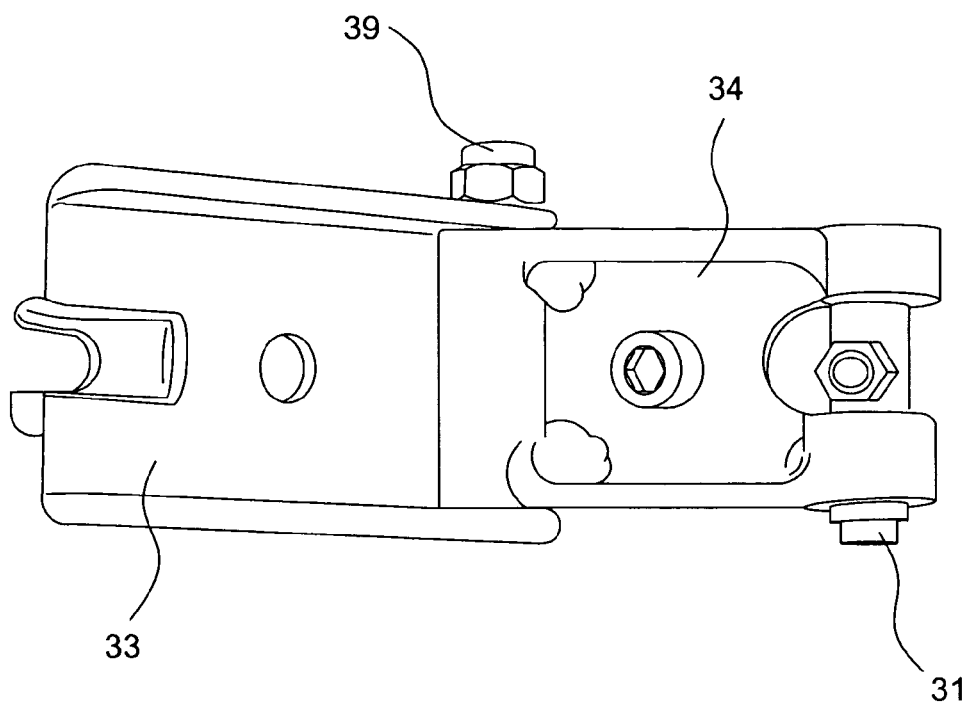
FIG. 14 inside elevation view of the open, two-part folding hinge assembly—in an un-folding position, and its safety locking pin.
Figure 15:
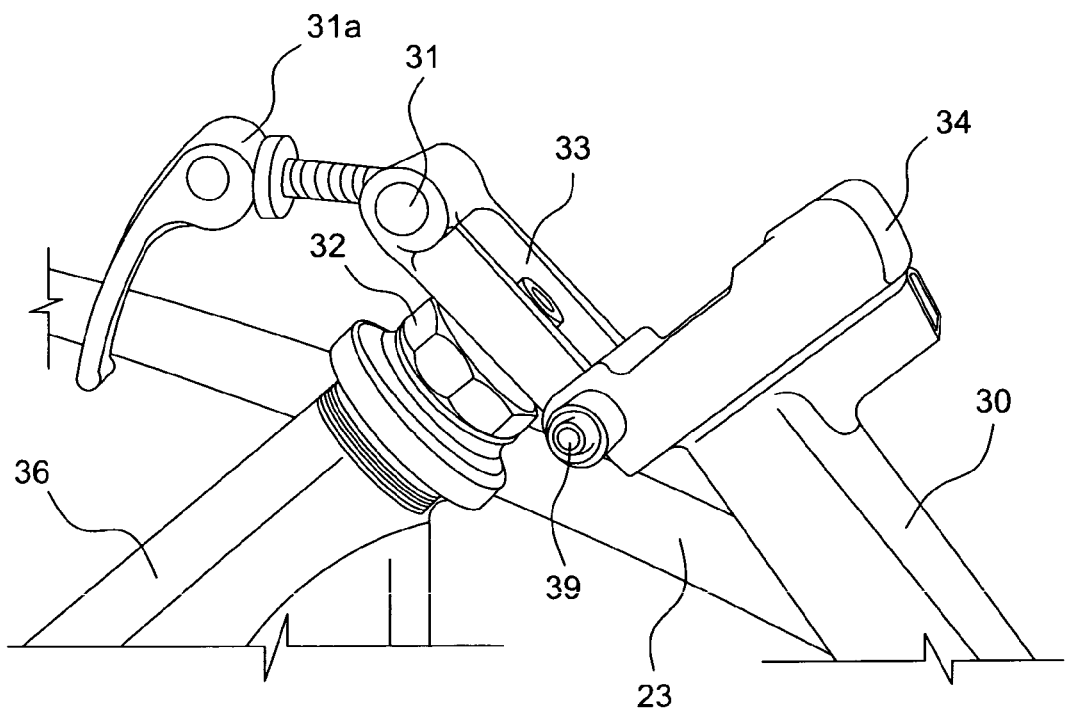
FIG. 15 is a side elevation view of FIG. 14, showing the open, two-part folding hinge assembly—in an un-folding position, showing one hinge mounted on the banana-shape supporting steering column, and the other hinge mounted on the steering column, the safety locking pin, and the open eccentric locking cam lever.

FIG. 14 and FIG. 15 close the circle of this description by showing the two-part hinge folding assembly of this personal transporter vehicle-scooter 10, as partially described for FIG. 3. This method and techniques are not new, but became part of this invention as an innovative new personal transporter, whereby it includes some of the existing features such this one. The two main parts involved in the folding mechanism of the main steering column 36 are:

a. The upper part of this personal transporter vehicle-scooter 10 from the top to the end of steering column 30;

b. The lower portion of the wheel assembly from the second, lower folding hinge and the extended steering column 36 (banana-shape) up to the front wheel 60, including all respective parts, above it up-to and including banana-shape leg 36, seen better in FIG. 4.

Referring now to FIG. 14, it show a top view of the two-part folding hinge assembly—in an un-folding position, and its safety, semi-permanent bolt 39, showing only its bolt head, and "push-in" locking pin 31. Each of the said connecting hinges 33 and 34 are made of a rectangular bar with extended walls in two sides.

There, the semi-permanent central hinge assembly bolt 39 is secured with a lock not (unseen) to enable stability, and when necessary, removing the upper portion (up to the end of the steering column) away, still used a central tube type enabling folding and unfolding depends on the position of the safety spring pin 31, which has two positions, such as open, when it is pushed backwards.

Note that while folding the personal transporter vehicle-scooter 10, locking pin 31 is extended outside, as seen in the figure, having a tiny spring inside, while it is completely secured by locking handle lever 31a seen in FIGS. 3, and 15 below.

This takes us to FIG. 15, which is a side elevation view of FIG. 14, showing the open, two-part folding hinge assembly—in an un-folding position, showing one hinge mounted on the banana-shape supporting steering column 36, and the other hinge bolted on steering column 30.

From the top, FIG. 15 shows the handle-lever 31a of the eccentric locking cam and the locking pin 31 (would be pushed out in any situation, folding or unfolding), an open lower hinge 33 formed on the extended steering column leg 36 through a spring bolt 32, an upper hinge 35 (also opened) whereby a central bolt 30 securing both hinges, whereby its locknut is unseen here, while said upper hinge is mounted on the steering column 30. Note that this mechanism has dual advantages:

First, it enables unfolding and folding the two sub-parts of the front wheels steering assembly in seconds (recall that the upper sub-part ends at the end of the steering column 30), and second, by removing the semi-assembled main bolt 39, said upper sub-part may be totally removed, and action which may be rarely done, and if and only necessary.

Note that as extensive as the summary, the description and the disclosure have been, it must be taken as form as example only and that the embodiments are simply illustrated of the main principles of the invention, thus they do not limit the process presented herein, since numerous additional modifications, changes and additions may be made by skilled persons in the area of art, within the category of said principles, and which will embody those principles, falling within the spirit, concept and scope of this invention.

What I claimed is:

1. A portable, three-wheel, leverless personal mobility vehicle comprising:
   A. a front wheel drive assembly comprising:
      (1). an upper sub-part assembly comprising:
         (a). a leverless, horizontal steering handle;
         (b). a throttle fastened on said steering handle;
         (c). a vertical steering column mounted on said steering handle;
      (2). a lower sub-part assembly comprising:
         (a). a fork assembly comprising a hollow tube coupled to first and second legs, wherein said hollow tube is configurable to be coupled to said vertical steering column;
         (b). a motor assembly comprising:
            i. an electric chain motor mounted on said fork assembly;
            ii. a first poly-sprocket mounted on said electric motor;
            iii. a motor cover mounted on said motor;
         (c). an electric control box mounted on said motor cover;
         (d). a front wheel assembly comprising:
            i. a front wheel supported on said fork assembly;
            ii. a drive shaft inserted in said front wheel, and mounted on said fork assembly between said first and second legs; and
            iii. a second poly-sprocket mounted on said drive shaft;
         (e) a chain mechanically coupling said first poly-sprocket and said second poly-sprocket;
      (3). an extended column leg extending backward from said hollow tube of said fork assembly; and
   B. a rear chassis assembly comprising:
      (1). a rear standing platform further comprising an electric outlet and a connecting means for a battery housing;
      (2). a rectangular frame supporting said rear standing platform, operable to be coupled to said extended column leg, and comprising a middle supporting tube;
      (3). a rear axle mounted to a rear portion of said rectangular frame;
      (4). left and right rear wheels assembled each on a respective end of said rear axle;
      (5). a hydraulic brake assembly for said left and right rear wheels comprising left and right disc brakes and a foot brake pedal operable to activate said left and right disc brakes, wherein each said disc brake is assembled on each respective left and right rear wheel;
      (6). wherein said foot brake pedal is installed on said rear standing platform;
      (7). a battery pack, comprising a battery housing and a battery member further comprising a battery, said battery housing comprising:
         a connecting member to said rectangular frame; and
         an electric plug to be inserted in said electric outlet formed on said rear standing platform;
      (8). an electrical connection between said battery and said rear standing platform, comprising said electrical outlet installed on said rear standing platform, and an electrical plug electrically coupled to said battery to connect said battery to said electrical outlet on said rear standing platform; and
      (9). a second electric connection, between said electrical outlet on said rear standing platform and said control box and said motor, operable to transfer power to said control box and to said motor.

2. A device according to claim 1, comprising a hinge folding and connecting mechanism, connecting said upper and lower sub-part assemblies of said personal mobility vehicle.

3. A device according to claim 2, wherein said hinge folding mechanism comprises:
   (a). an upper hinge portion mounted to a bottom portion of said vertical steering column of said upper sub-part assembly of said front wheel drive assembly;
   (b). a lower hinge portion fastened to a top portion of said hollow tube of said lower sub-part assembly of said front wheel drive assembly; and
   (c). an eccentric locking cam mechanism comprising a cam and:
      i. a locking lever coupled to said cam for controlling opening and closing of said upper and lower hinge portions;
      ii. a spring biased locking pin, for securing said locking lever; and
      iii. a central bolt operable for one of connecting and disconnecting said upper and lower hinge portions responsive to first and second positions of said cam, said hinge folding mechanism enabling folding and unfolding of said upper and lower sub-part assemblies of said front wheel assembly, and connecting said steering column to said hollow tube.

4. A device according to claim 1 comprising a two-part telescopic box fit connecting mechanism for connecting said front wheel assembly with said rear chassis assembly and for transferring power to said electric motor and to said control box.

5. A device according to claim 4, whereby the two-part telescopic box fit connecting mechanism comprises:
   (a). a front, upward part, mounted on a rear end of said extended column leg, serving as the receiving portion of said telescopic box fit connecting mechanism;
   (b). a rear, downward part, mounted on a front portion of said rectangular frame of said rear standing platform, serving as a sleeve of said telescopic box fit connecting mechanism operable to be slidingly coupled over said said front upward part to enable interconnection of said front wheel assembly and said rear chassis assembly, to configure said personal mobility vehicle for operation; and
   (c). an electric assembly comprising:
      i. an electrical outlet formed on said front part of said telescopic box fit connecting mechanism;
      ii. an electrical plug formed on said rear part of said telescopic box fit connecting mechanism, to transfer power from said battery to said motor through an extended wire connected to said motor and to said control box.

6. The device according to claim 5 wherein:
(a). said front first telescopic box fit connecting mechanism part mounted on said extended column leg, comprises a U-shaped structure, whereby an outer tube-type portion is operable as a recipient of a corresponding sleeve type tube;
(b). said rear second telescopic box fit connecting mechanism part, mounted on a middle front portion of said frame has a shape complimentary to said front first telescopic box fit connecting mechanism part.

7. The device of claim 6, wherein said U-shaped structure comprises a metal U-shaped structure.

8. The vehicle according to claim 1 including said hydraulic foot brake assembly comprising:
(a). left and right hydraulic brake discs, each attached inside said rear left and right wheel, respectively;
(b). left and right pressure lines, connected to said respective left and right hydraulic brakes formed on a bottom of said rear standing platform;
(c). a brake actuator, connecting both said pressure lines, located on an upper portion of said rear standing platform for use by such driver, whereby said personal mobility vehicle comes to a stop upon actuation of said brake actuator.

9. The hydraulic foot brake mechanism according to claim 8, wherein said
brake actuator may be positioned:
anywhere on said vehicle, wherein said brake actuator comprises one of a lever, a pedal, and a button.

10. The vehicle set forth in claim 1, wherein said motor assembly further comprises, a first, upper motor pulley formed with numerous teeth; a second, lower, speed-controlling drive shaft pulley formed with a smaller number of teeth, a motor chain assembled through both said pulleys, and a drive shaft inserted through said front wheel, supported on first and second legs of said fork assembly.

11. The vehicle according to claim 1 wherein said vehicle comprises a means of electrically activating said vehicle.

12. The electric means of claim 11 comprising a switch button fastened on said steering handle and electrically coupled to said control box and to said motor, enabling a driver to turn said personal mobility vehicle one of on and off.

13. The vehicle according to claim 1 wherein said personal mobility vehicle comprises a key lock mechanism operable to lock and unlock the motor, wherein said key lock mechanism is located on said electric motor.

14. The device of claim 1, wherein said frame comprises a metal frame.

15. A personal mobility vehicle comprising:
a front wheel assembly comprising:
 a front wheel;
 a steering handle comprising:
  an on/off button connected to a control box;
  a throttle communicatively connected to an electric motor;
  a non-emergency front wheel brake lever fastened on said steering handle coupled to a brake cable connected to a brake mechanism on said front wheel;
 a steering column coupling said steering handle to said front wheel via a hinge folding mechanism;
 a fork assembly extending from said hinge folding mechanism to support said front wheel;
 a control box electrically coupled to a battery and to said motor and operable to regulate energy supplied from said battery;
 a first speed-controlling sprocket mechanically coupled to said motor;
 a second speed-controlling sprocket mechanically mounted on a drive shaft operable to drive said front wheel;
 a motor chain mechanically coupling said motor sprocket to said drive shaft sprocket;
 said drive shaft inserted in said front wheel and supported by said fork assembly; and
 a backward extended column leg comprising a first portion of an upright extended telescopic box fit assembly;
a rear chassis assembly comprising:
 a rear driver's platform comprising:
  an electric outlet; and
  a connecting means for a battery housing;
 a metal frame supporting said rear standing platform and comprising a middle portion support tube;
 an axle, mounted to a rear portion of said metal frame, having left and right ends;
 left and right rear wheels assembled each on a respective end of said axle;
 a hydraulic rear wheel brake assembly comprising:
  left and right brake discs assembled on each respective rear wheel; and
  a foot brake pedal installed on said rear standing platform;
 a battery pack, comprising;
  a battery housing; and
  a battery member comprising a battery;
  wherein:
   said battery housing comprises:
    a connecting member to said frame; and
    an electric plug to be inserted in said electric outlet formed on said platform;
  an electric mechanism for said battery and for said platform comprising:
   an outlet means attached to said platform; and
   an electrical plug extending from said battery member; and
  a second electric mechanism to supply power to said electric motor.

16. The device of claim 15, wherein said electric motor comprises an electric chain motor.

* * * * *